(12) United States Patent
Maeda et al.

(10) Patent No.: US 10,346,956 B2
(45) Date of Patent: Jul. 9, 2019

(54) IMAGE PROCESSING DEVICE

(71) Applicant: PANASONIC INTELLECTUAL PROPERTY MANAGEMENT CO., LTD., Osaka (JP)

(72) Inventors: Tomohide Maeda, Kanagawa (JP); Akihiro Furuta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 15/743,467

(22) PCT Filed: Jul. 19, 2016

(86) PCT No.: PCT/JP2016/003386
§ 371 (c)(1),
(2) Date: Jan. 10, 2018

(87) PCT Pub. No.: WO2017/013871
PCT Pub. Date: Jan. 26, 2017

(65) Prior Publication Data
US 2018/0204309 A1    Jul. 19, 2018

(30) Foreign Application Priority Data

Jul. 22, 2015 (JP) .................................. 2015-144912
Jul. 4, 2016 (JP) .................................. 2106-132548

(51) Int. Cl.
*G06T 5/00* (2006.01)
*G06T 3/40* (2006.01)
(Continued)

(52) U.S. Cl.
CPC ............ *G06T 5/003* (2013.01); *G06T 3/0068* (2013.01); *G06T 3/4053* (2013.01); *G06T 5/50* (2013.01)

(58) Field of Classification Search
USPC ........................................................ 382/255
See application file for complete search history.

(56) References Cited

U.S. PATENT DOCUMENTS 6,285,804 B1 * 9/2001 Crinon .................. G06T 3/4069
348/699
2012/0086850 A1 * 4/2012 Irani ..................... G06T 3/4053
348/441
(Continued)

FOREIGN PATENT DOCUMENTS

JP     2011-259119     12/2011

OTHER PUBLICATIONS

International Search Report (ISR) from International Searching Authority (Japan Patent Office) in International Pat. Appl. No. PCT/JP2016/003386, dated Sep. 27, 2016.

*Primary Examiner* — Fayyaz Alam
(74) *Attorney, Agent, or Firm* — Greenblum & Bernstein, P.L.C.

(57) ABSTRACT

Included are a fiducial frame adjustment unit (18) that displays a parameter used when an image of a fiducial frame and a high-resolution image are generated, updates display contents of the image of the fiducial frame based on adjustment of the displayed parameter, and stores the adjusted parameter as parameters for the fiducial frame and a reference frame in a fiducial point position holding memory (17A) and a blur PSF parameter holding memory (17B), and a reference frame adjustment unit (19) that displays a parameter for the reference frame when an image of a reference frame is displayed, updates display contents of the image of the reference frame based on adjustment of the displayed parameter, and stores the adjusted parameter as the parameter for the reference frame in the fiducial point position holding memory (17A) and the blur PSF parameter holding memory (17B).

5 Claims, 35 Drawing Sheets

(51) Int. Cl.
*G06T 3/00* (2006.01)
*G06T 5/50* (2006.01)

(56) References Cited

U.S. PATENT DOCUMENTS

| | | | |
|---|---|---|---|
| 2012/0105658 A1* | 5/2012 | Ishii | G06T 5/003 |
| | | | 348/208.6 |
| 2012/0213452 A1 | 8/2012 | Matsuyama et al. | |
| 2016/0005158 A1* | 1/2016 | Asano | H04N 5/349 |
| | | | 382/154 |
| 2016/0078606 A1* | 3/2016 | Ra | G06T 11/005 |
| | | | 382/128 |

* cited by examiner

FIG. 9

$$M = \begin{Bmatrix} h1 & h2 & h3 \\ h4 & h5 & h6 \\ h7 & h8 & 1 \end{Bmatrix}$$

| COORDINATE DESIGNATION | X | Y | | X | Y |
|---|---|---|---|---|---|
| POINT 1 | 286.0000 | 351.0000 | POINT 2 | 326.0000 | 351.0000 |
| POINT 3 | 286.0000 | 380.0000 | POINT 4 | 326.0000 | 380.0000 |

BLUR PSF IMAGE

| COORDINATE DESIGNATION | X | Y | | X | Y |
|---|---|---|---|---|---|
| POINT 1 | 295.6250 | 360.5000 | POINT 2 | 318.3750 | 358.5000 |
| POINT 3 | 296.0000 | 371.6250 | POINT 4 | 318.7500 | 369.8750 |

BLUR PSF IMAGE

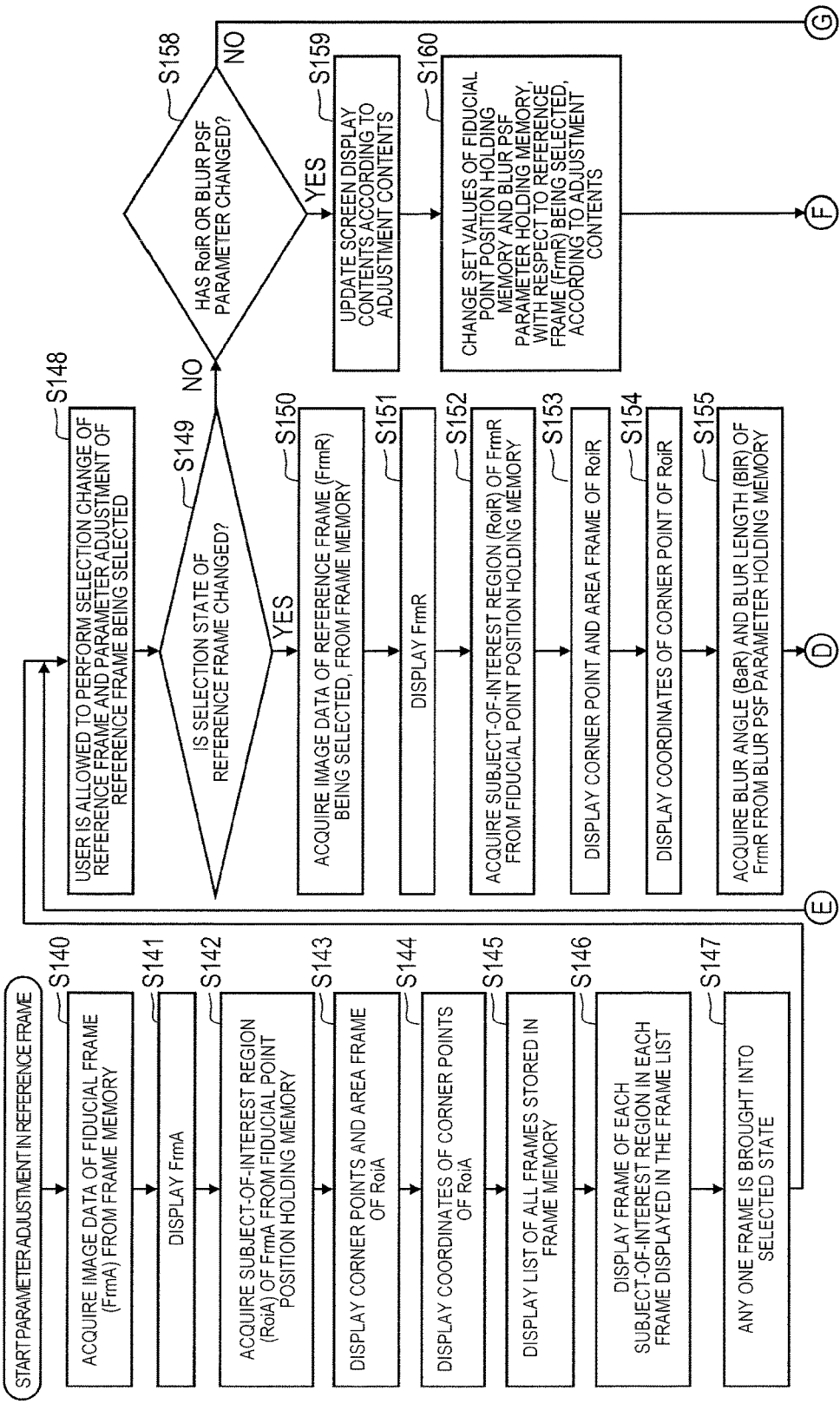

| COORDINATE DESIGNATION | X | Y | | X | Y |
|---|---|---|---|---|---|
| POINT 1 | 290.7500 | 357.2500 | POINT 2 | 313.0000 | 355.5000 |
| POINT 3 | 291.0449 | 368.3445 | POINT 4 | 313.2500 | 366.7500 |

BLUR PSF IMAGE

BLUR PSF IMAGE

FIG. 21

$$M_Z = \begin{pmatrix} Z & 0 & 0 \\ 0 & Z & 0 \\ 0 & 0 & 1 \end{pmatrix}$$

IMAGE PROCESSING DEVICE

TECHNICAL FIELD

The present disclosure relates to an image processing device, and more particularly to an image processing device which aligns low-resolution images of a plurality of input frames each having a common partial region to generate a high-resolution image.

BACKGROUND ART

When images of a plurality of input frames obtained by capturing the same subject have low resolution and there is positional deviation, the images are aligned and superimposed, thereby generating an image with high resolution. The process of generating a high-resolution image from the plurality of low-resolution images is called a super-resolution process.

Here, misalignment occurs in images in a case of imaging a stationary subject while moving a camera, or a case of imaging a moving subject with a fixed camera. In a case where the subject and the camera are completely stationary, no matter how many images are superimposed, the resolution is not increased.

For alignment (matching) of images, it is common to obtain an alignment parameter (geometric transformation matrix such as translation and rotation) using template matching or feature point matching. In addition, it is common to use a reconfiguration method for superimposing images. The reconfiguration method is a method of generating an estimated image of a high-resolution image, repeating update and evaluation of the estimated image so that the likelihood of the estimated image is maximized, and setting the converged solution of the estimated image as a final output. As the likelihood of the estimated image, there is [1] how much a low-resolution image obtained by degrading the resolution by shifting the position of the estimated image is close to an original input image, [2] whether the connection of pixel values in the estimated image is natural or not, or the like.

Meanwhile, in an automatic matching process in which images are automatically aligned, a process of finding and matching fiducial points is performed in alignment of images of a plurality of input frames, but mismatch due to erroneous detection of the fiducial point cannot be avoided. Especially, since subject blur is generated when a moving subject is captured at a slow shutter speed, the possibility of mismatch increases.

In order to reduce the possibility of mismatch due to the subject blur, the subject blur of the image may be removed before performing the super-resolution process. In order to remove the subject blur, a method of performing deconvolution is adopted, from a blur image and blur PSF, based on a model in which a result of convolving blur PSF on the original image without blur is a blur image (refer to PTL 1). This method makes it possible to obtain a blur removed image similar to the original image.

CITATION LIST

Patent Literature

PTL 1: JP-A-2011-259119

SUMMARY OF THE INVENTION

However, even if the subject blur is removed before performing the super-resolution process, it is difficult to completely avoid the problem of mismatch due to the influence of noise or the like. In the automatic matching process, in a case where good matching cannot be performed, images of frames that should be used originally are excluded. As a result, the number of usable frames decreases, and even if the super-resolution process is performed, a high-resolution image cannot be obtained.

This problem can be avoided by manually aligning each image without going through the automatic matching process, but the task of aligning images of a plurality of input frames by displaying the images one by one and manually shifting them little by little is very cumbersome and unproductive.

The present disclosure has been made in view of these problems, and an object is to provide an image processing device capable of improving work efficiency in a case of manually aligning images of a plurality of input frames.

An image processing device of the present disclosure is an image processing device which aligns low-resolution images of a plurality of input frames each having a common partial region to generate a high-resolution image, and includes a fiducial frame adjustment unit that displays a parameter used when an image of one fiducial frame selected from the plurality of input frames and a high-resolution image are generated, updates display contents of the image of the fiducial frame based on adjustment of the displayed parameter, and stores the adjusted parameter as a parameter for the fiducial frame in a memory; a reference frame adjustment unit that displays an image of a reference frame which is one of the input frames other than the fiducial frame and a parameter for the fiducial frame as a parameter for the reference frame, updates display contents of the image of the reference frame based on adjustment of the displayed parameter, and stores the adjusted parameter as the parameter for the reference frame in the memory; a blur removal unit that performs a process of removing blur included in the input frames, using the corresponding parameter, for each of the input frames; and an image generation unit that aligns low-resolution images of the blur-removed input frames to generate a high-resolution image.

According to the present disclosure, since the adjustment result in the fiducial frame can be reflected on all the other reference frames, in a case of manually aligning the images of a plurality of input frames, it is possible to reduce the input work, and improve work efficiency. As a result, since the number of frames that can be used for the super-resolution process increases, a high-resolution image can be obtained by the super-resolution process.

BRIEF DESCRIPTION OF DRAWINGS

FIG. 9 is a diagram showing an example of a geometric transformation matrix used for an automatic alignment process in the super-resolution process of the present disclosure.

FIG. 15 is a flowchart for explaining a parameter adjustment process in a reference frame in the super-resolution process of the image processing device according to Exemplary Embodiment 1.

FIG. 21 is a diagram showing an example of expansion transformation matrix Mz used for the reconfiguration process.

DESCRIPTION OF EMBODIMENTS

Hereinafter, exemplary embodiments will be described in detail with reference to the drawings.

(Exemplary Embodiment 1)

Figure 1:
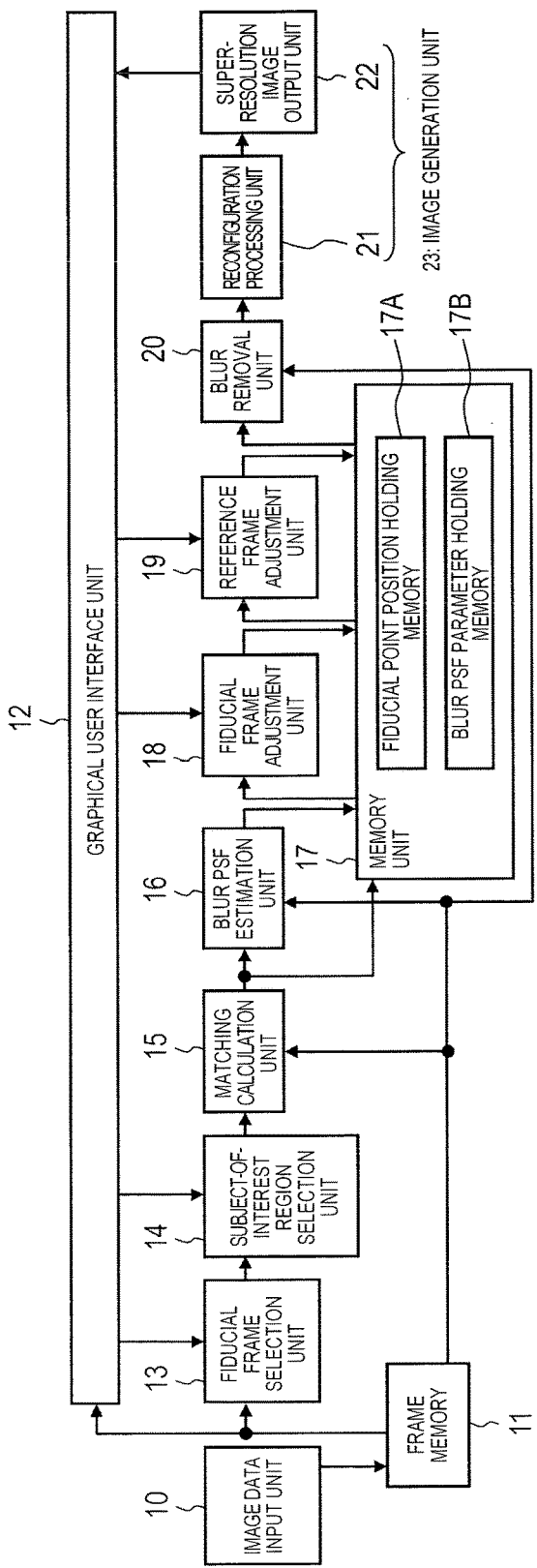
FIG. 1 is a block diagram illustrating a schematic configuration of an image processing device according to Exemplary Embodiment 1.

FIG. 1 is a block diagram illustrating a schematic configuration of an image processing device 1 according to Exemplary Embodiment 1. In FIG. 1, image processing device 1 according to the present exemplary embodiment is a device that performs a super-resolution image process of generating a high-resolution image from a plurality of low-resolution images, and includes image data input unit 10, frame memory 11, graphical user interface unit 12, fiducial frame selection unit 13, subject-of-interest region selection unit 14, matching calculation unit 15, blur PSF estimation unit 16, memory unit 17, fiducial frame adjustment unit 18, reference frame adjustment unit 19, blur removal unit 20, reconfiguration processing unit 21, and super-resolution image output unit 22. Memory unit 17 includes fiducial point position holding memory 17A and blur PSF parameter holding memory 17B. Reconfiguration processing unit 21 and super-resolution image output unit 22 constitute image generation unit 23.

Image data input unit 10 inputs image data which is sequentially output on a frame unit basis from a camera (not shown). The image data on a frame basis input by image data input unit 10 is also referred to as an input frame. Frame memory 11 temporarily stores the input frame. Graphical user interface unit 12 is a user interface that provides intuitive operations using computer graphics and a pointing device such as a mouse.

Fiducial frame selection unit 13 selects one of a plurality of input frames stored in frame memory 11, and sets it as a fiducial frame. The input frame to be a fiducial frame is selected by evaluating the image quality of each of the plurality of input frames stored in frame memory 11 and selecting the input frame with the highest evaluation, or by displaying a list of the plurality of input frames stored in frame memory 11 and allowing the user to select one of them.

Subject-of-interest region selection unit 14 sets a subject-of-interest region (partial region) in the fiducial frame selected by fiducial frame selection unit 13. The setting of the subject-of-interest region for the fiducial frame is performed by the user. That is, the user uses a pointing device such as a mouse to set the subject-of-interest region.

Matching calculation unit 15 finds a region matching the subject-of-interest region of the fiducial frame, for each of a plurality of input frames other than the fiducial frame stored in frame memory 11.

Blur PSF estimation unit 16 finds the center point of the region matching the image data of the subject-of-interest region of the fiducial frame in each of the plurality of input frames other than the fiducial frame, further calculates the angle and length of blur from the motion vector at the center point, and stores them as blur PSF parameters.

Fiducial frame adjustment unit 18 displays the position of a partial region and a blur PSF parameter used for generating the image of one fiducial frame selected from among the plurality of input frames and a high-resolution image, updates the display contents of the image of the fiducial frame based on adjustment of the position of the partial region and blur PSF parameters which are displayed, stores the position of the partial region and the blur PSF parameter which are adjusted, as the position of the partial region of the fiducial frame and the blur PSF parameter, in fiducial point position holding memory 17A and blur PSF parameter holding memory 17B, respectively, and updates the positions of the partial regions and the blur PSF parameter of the plurality of input frames other than the fiducial frame in fiducial point position holding memory 17A and blur PSF parameter holding memory 17B, respectively.

Reference frame adjustment unit 19 displays the image of the reference frame which is one of the plurality of input frames other than the fiducial frame, the position of the partial region of the reference frame, and blur PSF parameters, updates the display content of the image of the reference frame based on adjustment of the position of the partial region and blur PSF parameters which are displayed, and stores the position of the partial region and blur PSF parameters which are adjusted, as the position of the partial region of the reference frame and blur PSF parameters, in fiducial point position holding memory 17A and blur PSF parameter holding memory 17B, respectively.

Blur removal unit 20 performs a process of removing blur included in the input frame, using the corresponding blur PSF parameter, for each of the plurality of input frames stored in frame memory 11. Reconfiguration processing unit 21 aligns low-resolution images of the blur-removed frames to generate a high-resolution image. Super-resolution image output unit 22 outputs the high-resolution image generated by reconfiguration processing unit. 21.

Next, the operation of the image processing device 1 according to the present exemplary embodiment will be described.

(Super-resolution Process)

Figure 2:
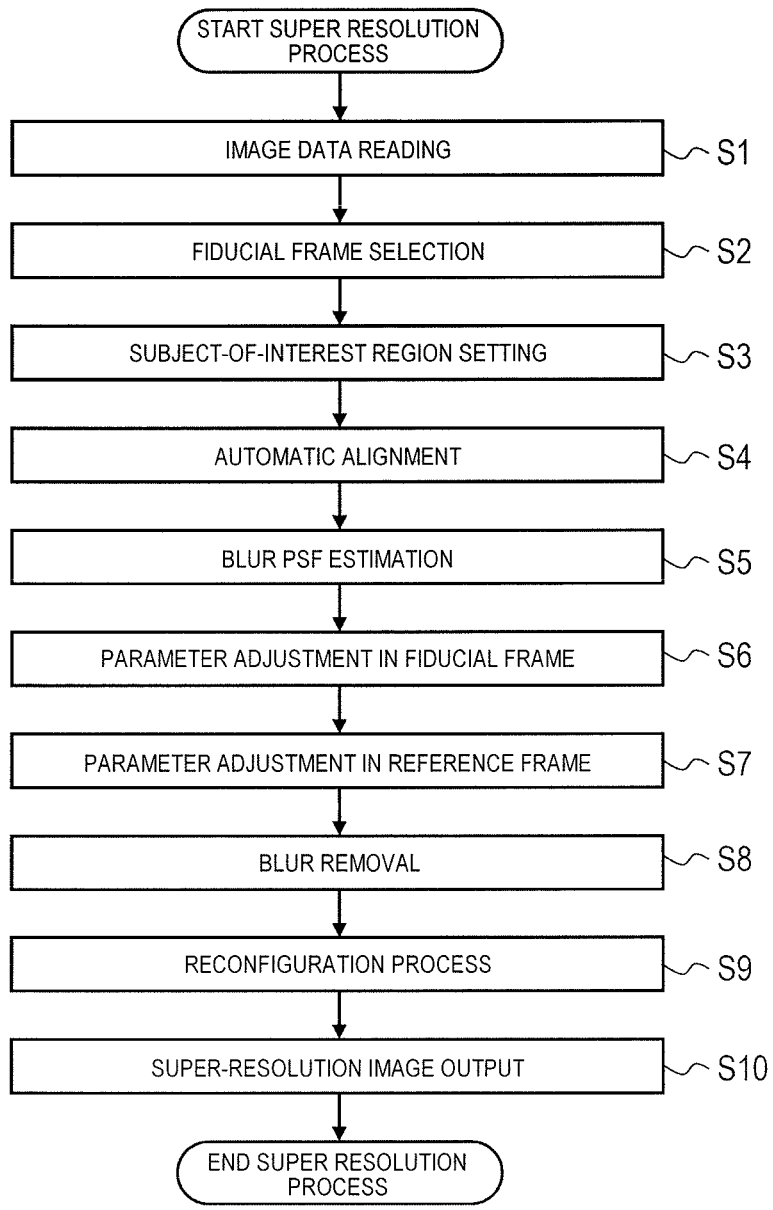
FIG. 2 is a flowchart for explaining a super-resolution process adapted for automatic alignment, in the image processing device according to Exemplary Embodiment 1.
Figure 3:
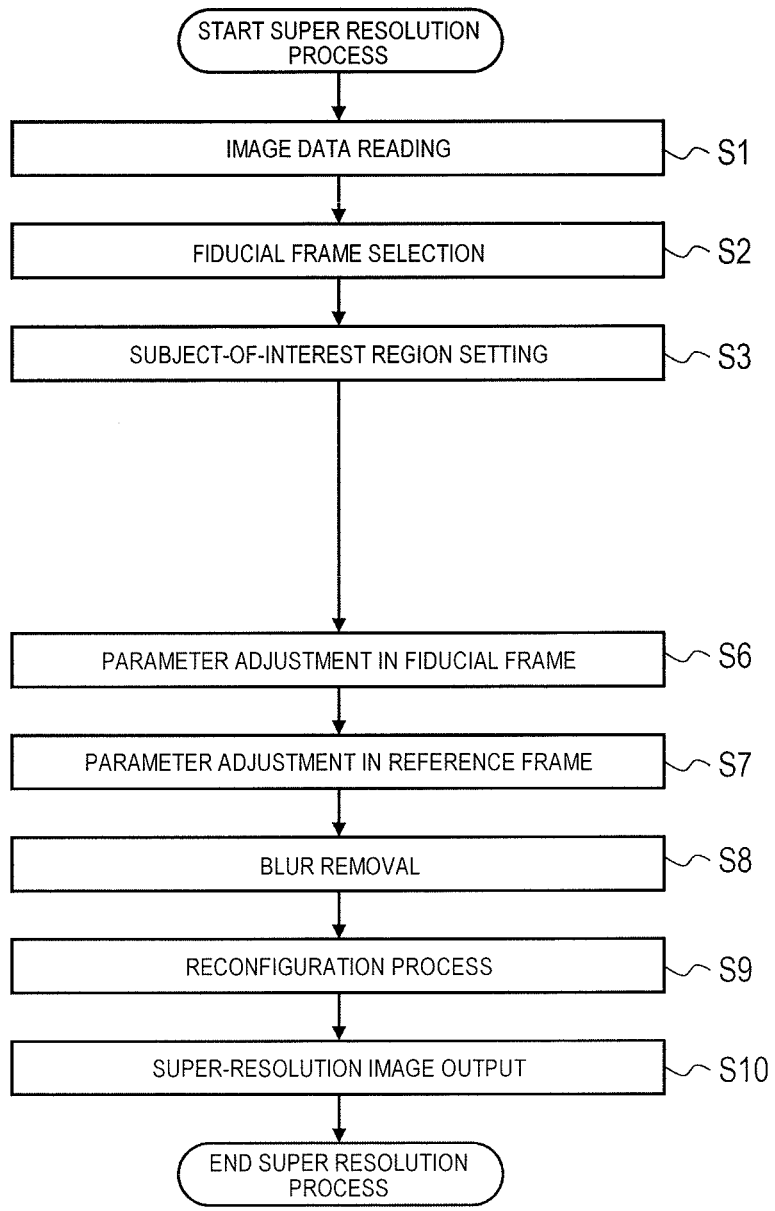
FIG. 3 is a flowchart for explaining the super-resolution process adapted for manual alignment, in the image processing device according to Exemplary Embodiment 1.

FIG. 2 is a flowchart showing a super-resolution process. In FIG. 2, the super-resolution process has ten steps: image data reading (step S1), fiducial frame selection (step S2), subject-of-interest region setting (step S3), automatic alignment (step S4), blur PSF estimation (step S5), parameter adjustment in a fiducial frame (step S6), parameter adjustment in reference frame (step S7), blur removal (step S8), reconfiguration process (step S9), and super-resolution image output (step S10). The super-resolution process shown in FIG. 2 is for automatic positioning, but there are cases in which alignment is performed manually. FIG. 3 is a flowchart showing the super-resolution process adapted for manual alignment. In the case of manual alignment, two steps of the automatic alignment in step S4 and blur PSF estimation in step S5 are unnecessary. Hereinafter, each step of the super-resolution process in the case of using automatic alignment will be described in detail.

(Image Data Reading Process)

Figure 4:
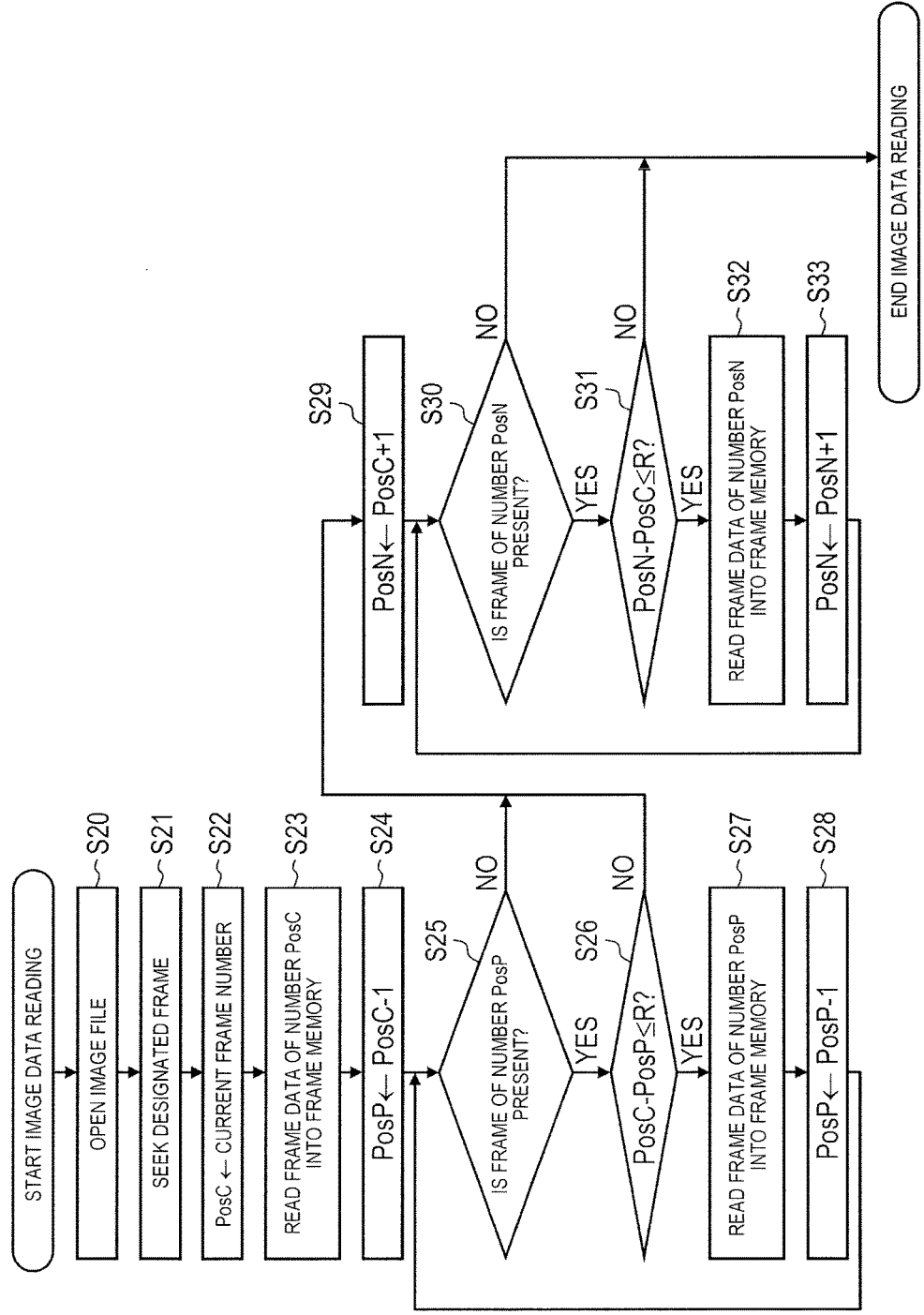
FIG. 4 is a flowchart for explaining an image data reading process in the image processing device according to Exemplary Embodiment 1.

FIG. 4 is a flowchart for explaining an image data reading process. In FIG. 4, PosC, PosP, and PosN are registers, respectively. First, an image file is opened (step S20) and (moving to) the designated frame is sought (step S21). Then, the frame number of the designated current input frame is set in PosC (step S22). Subsequently, the frame data of the frame number of the current input frame set in PosC is read into frame memory 11 (step S23). Subsequently, the setting value of PosC is decremented by "1", and the obtained value is set in PosP (step S24). That is, the frame number of the input frame which is one frame before the current input frame is set in PosP.

Subsequently, it is determined whether or not the frame data of the frame number set in PosP is present (step S25). In the determination, in a case where frame data of the frame number set in PosP is present (step S25: YES), it is determined whether or not the value obtained by subtracting the frame number set in PosP from the frame number set in PosC is "R" or less (step S26). Here, "R" is the maximum number of frames that can be referred to before and after the current frame as a base point, and is a value set in advance by the user.

In a case where the value obtained by subtracting the frame number set in PosP from the frame number set in PosC is "R" or less (step S26: YES), the frame data of the frame number set in PosP is read into frame memory 11 (step S27). Then, the frame number set in PosP is decremented by "1" (step S28), and the process returns to the determination in step S25.

On the other hand, if there is no frame data of the frame number set in PosP, in step S25 (step S25: NO) or the value obtained by subtracting the frame number set in PosP from the frame number set in PosC is larger than "R" in step S26 (step S26: NO), "1" is added to the value of PosC and the obtained value is set in PosN (step S29). That is, the frame number of the input frame which is one frame after the current input frame is set in PosN. Then, it is determined whether or not the frame data of the frame number set in PosN is present (step S30). In the determination, in a case where the frame data of the frame number set in PosN is present (step S30: YES), it is determined whether or not the value obtained by subtracting the frame number set in PosC from the frame number set in PosN is "R" or less (step S31).

In a case where the value obtained by subtracting the frame number set in PosC from the frame number set in PosN is "R" or less (step S31: YES), the frame data of the frame number set in PosN is read into frame memory 11 (step S32). Subsequently, "1" is added to the frame number set in PosN (step S33), and the process returns to the determination in step S30.

On the other hand, if there is no frame data of the frame number set in PosN instep S30 (step S30: NO) or the value obtained by subtracting the frame number set in PosC from the frame number set in PosN is more than "R" in step S31 (step S31: NO), the reading of the image data is ended.

(Fiducial Frame Selection Process)

Figure 5:
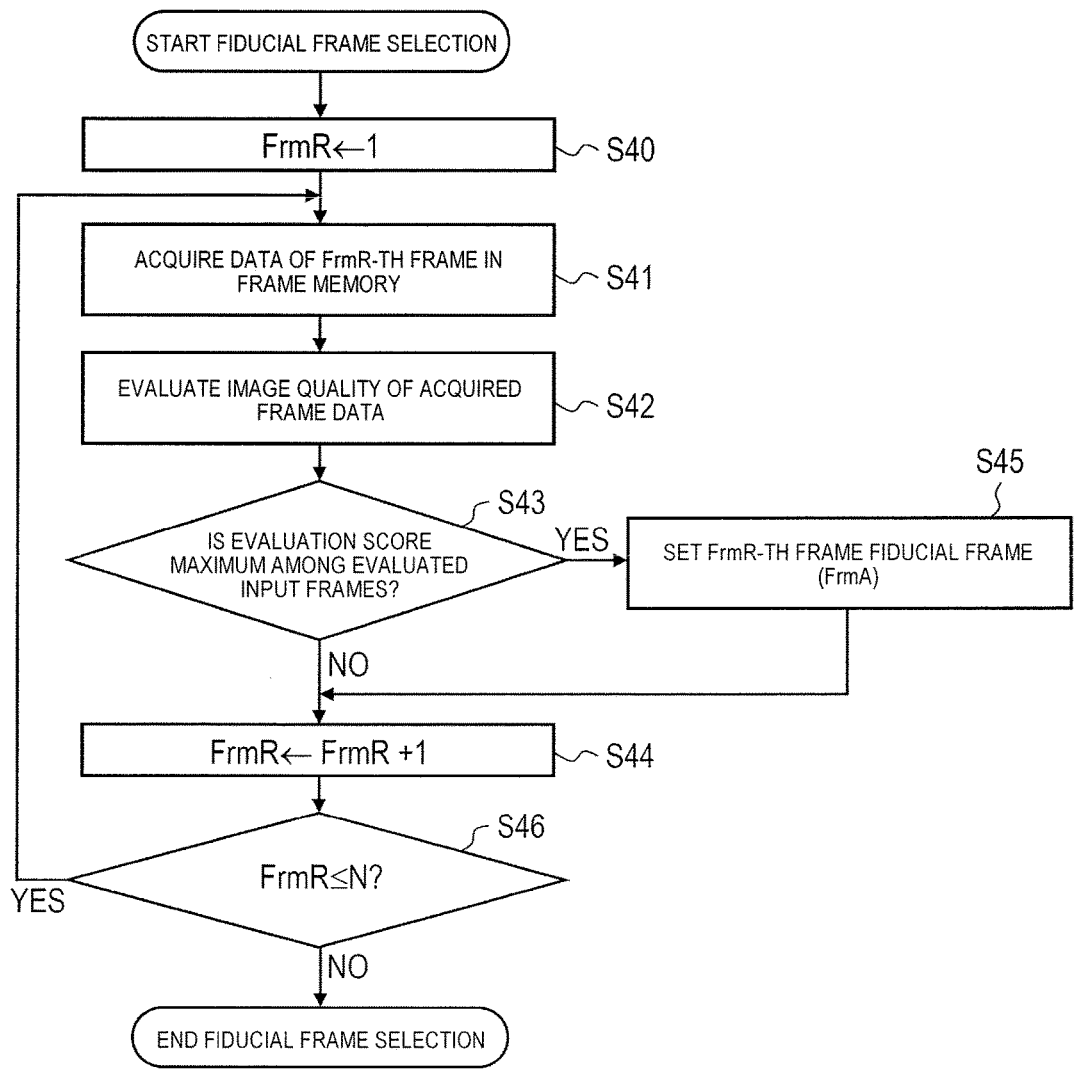
FIG. 5 is a flowchart for explaining a process of automatically selecting a fiducial frame, in the super-resolution process of the image processing device according to Exemplary Embodiment 1.

FIG. 5 is a flowchart for explaining the fiducial frame selection process. In FIG. 5, FrmR is a register. First, "1" is set in FrmR (step S40). Subsequently, data of an FrmR-th input frame in frame memory 11 is acquired (step S41). Then, the image quality of the acquired frame data is evaluated to obtain an evaluation score (step S42). Subsequently, it is determined whether or not the evaluation score obtained this time is maximum among the evaluated input frames (step S43). In a case where the evaluation score obtained this time is not maximum (step S43: NO), "1" is added to the value of FrmR, and the obtained value is set in FrmR (step S44).

On the other hand, if the evaluation score obtained this time is the maximum (step S43: YES), the FrmR-th input frame is set as a fiducial frame (FrmA) (step S45). Here, it is preferable to set the input frame with high image quality (strong compression is not applied in the codec and high frequency components remain well) as a fiducial frame. For example, a method is effective which converts each frame data into frequency domain data, evaluates the image quality according to whether the high frequency component is more or less, and uses an input frame with the most high frequency component as the fiducial frame.

After the process of step S45, "1" is added to the value of FrmR, and the obtained value is set in FrmR (step S44). Subsequently, it is determined whether or not the value of FrmR is "N" (the total number of input frames stored in frame memory 11) (step S46) or less. In a case where the value of FrmR is "N" or less (step S46: YES), the process returns to step S41, and in a case where the value of FrmR is more than "N" (step S46: NO), the fiducial frame selection process is ended.

The fiducial frame selection process is for a case of automatically selecting a fiducial frame, but the user may manually select a fiducial frame.

Figure 6:
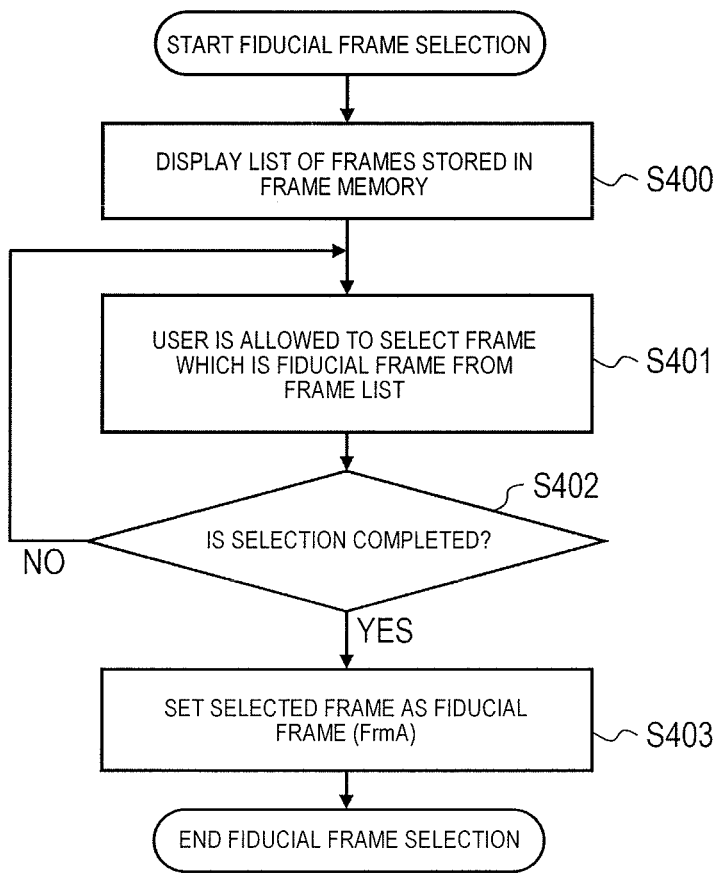
FIG. 6 is a flowchart for explaining a process of manually selecting the fiducial frame, in the super-resolution process of the image processing device according to Exemplary Embodiment 1.

FIG. 6 is a flowchart for explaining the fiducial frame selection process in a case where the user manually selects a fiducial frame. First, the list of input frames stored in frame memory 11 is displayed (step S400). Then, the user is allowed to select an input frame for a fiducial frame from the input frame list (step S401). That is, an instruction to select an input frame for a fiducial frame from the input frame list is issued to the user. After the instruction is issued, it is determined whether or not selection of the input frame for the fiducial frame is completed (step S402). In a case where the selection is not completed (step S402: NO), the process returns to step S401, and in a case where the selection is completed (step S402: YES), the selected input frame is set as a fiducial frame (FrmA) (step S403). After this process, the fiducial frame selection process is ended.

(Subject-of-interest Region Setting Process)

Figure 7:
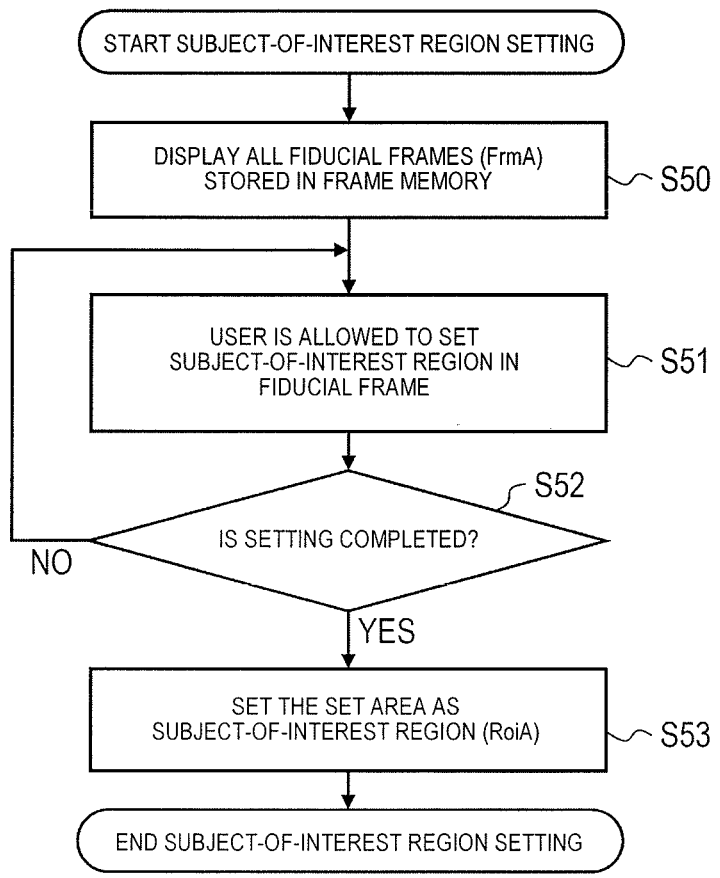
FIG. 7 is a flowchart for explaining a subject-of-interest region setting process in the super-resolution process of the image processing device according to Exemplary Embodiment 1.

FIG. 7 is a flowchart for explaining the subject-of-interest region setting process. In FIG. 7, first, all fiducial frames (FrmA) stored in frame memory 11 are displayed (step S50). Subsequently, the user is allowed to set the subject-of-interest region in the fiducial frame (step S51). That is, an instruction to set the subject-of-interest region in the fiducial frame is issued to the user. In this case, the user clicks and drags the rectangular area with the mouse to select it on the displayed frame image, or opens the setting window and inputs the coordinate values of the four corners of the rectangular area numerically. Alternatively, the following variations are also conceivable, by using an image process together. That is, by clicking only one point on the subject-of-interest on the displayed frame image, the image in the vicinity of the clicked point is processed, and the subject-of-interest region is automatically detected and set. For example, an edge is detected, a rectangle surrounding clicked points is extracted, a rectangle that seems to be the number plate most is selected, and a rectangular region surrounding the rectangle is set as a subject-of-interest region.

Subsequently, it is determined whether or not the setting of the subject-of-interest region for the fiducial frame has been completed (step S52). In a case where the setting of the subject-of-interest region for the fiducial frame has not been completed (step S52: NO), the process returns to step S51. In a case where the setting of the subject-of-interest region for the fiducial frame has been completed (step S52: YES), the set area is set as the subject-of-interest region (RoiA) (step S53). After this process, the subject-of-interest region setting process is ended.

(Automatic Alignment Process)

Figure 8:
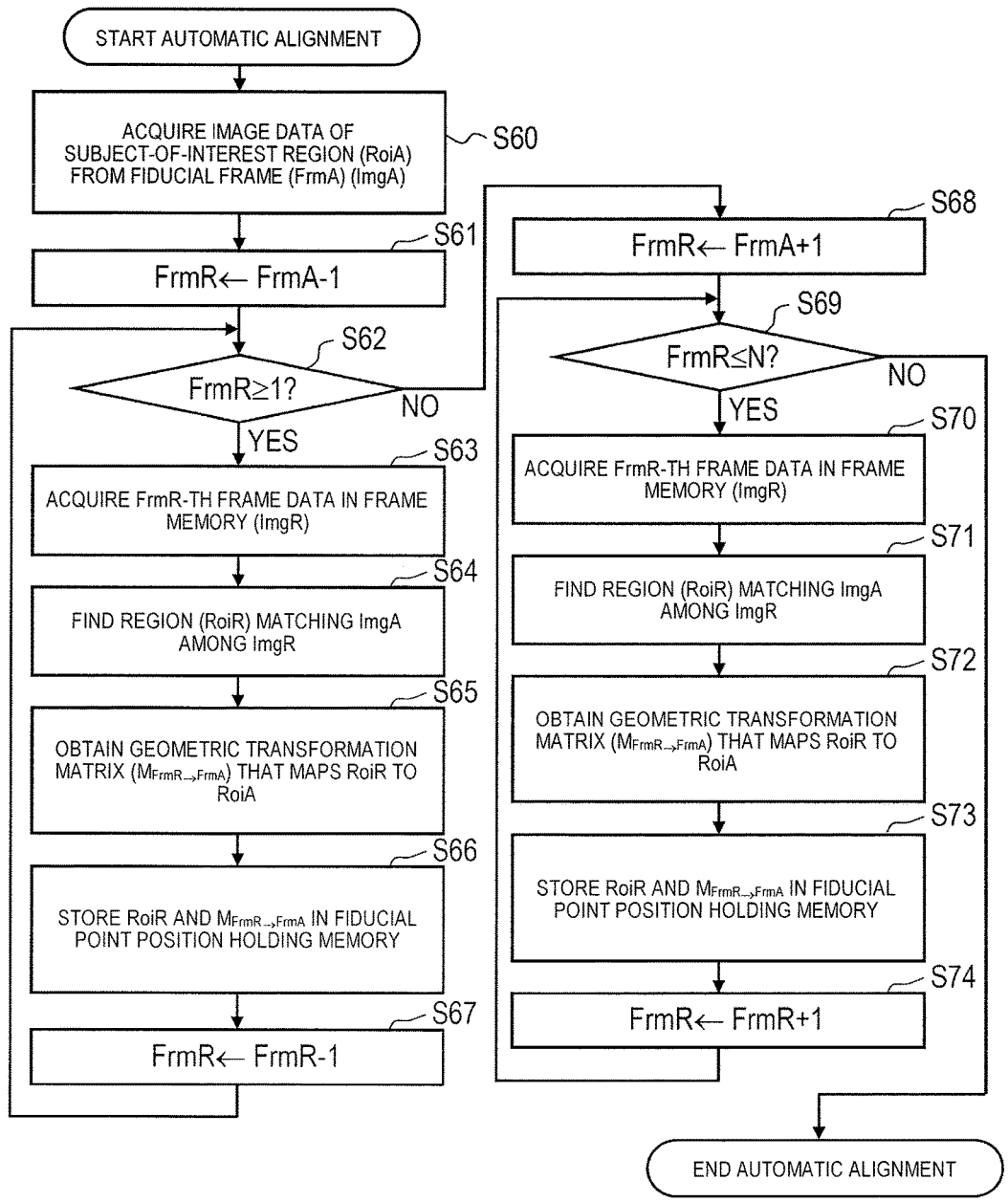
FIG. 8 is a flowchart for explaining an automatic alignment process in the super-resolution process of the image processing device according to Exemplary Embodiment 1.

FIG. 8 is a flowchart for explaining the automatic alignment process. In FIG. 8, first, the image data (ImgA) of the subject-of-interest region (RoiA) is acquired from the fiducial frame (FrmA) (step S60). Subsequently, the value of FrmA is decremented by "1", the obtained value is set in FrmR (step S61), and it is determined whether or not the value of FrmR is "1" or more (step S62). In this determination, in a case where the value of FrmR is "1" or more (step S62: YES), the FrmR-th frame data in frame memory 11 is acquired (ImgR) (step S63). Subsequently, a region matching ImgA is found in ImgR (RoiR) (step S64). When a region matching ImgA is found in ImgR, geometric transformation matrix ($M_{FrmR \to FrmA}$) that maps the RoiR to RoiA is obtained (step S65).

Subsequently, RoiR and geometric transformation matrix ($M_{FrmR \to FrmA}$) is stored in fiducial point position holding memory 17A (step S66). Thereafter, the value of FrmR is decremented by "1", the obtained value is set in FrmR (step S67), and the process returns to step S62.

On the other hand, in a case where it is determined in step S62 that the value of FrmR is less than "1" (step S62: NO), "1" is added to the value of FrmA, the obtained value is set in FrmR (step S68), and it is determined whether or not the value of FrmR is "N" or less (step S69). In this determination, in a case where the value of FrmR is "N" or less (step S69: YES), the FrmR-th frame data in frame memory 11 is acquired (ImgR) (step S70). Subsequently, a region matching ImgA is found in ImgR (RoiR) (step S71). Geometric transformation matrix ($M_{FrmR \to FrmA}$) that maps the found RoiR to RoiA is obtained (step S72).

The RoiR and geometric transformation matrix ($M_{FrmR \to FrmA}$) are stored in fiducial point position holding memory 17A (step S73). Thereafter, "1" is added to the value of FrmR, the obtained value is set in FrmR (step S74), and the process returns to step S69.

In a case where it is determined in step S69 that the value of FrmR is more than "N" (step S69: NO), the automatic alignment process is ended.

Here, known methods such as template matching and feature point matching can be used for matching. The geometric transformation matrix M is obtained by solving the following eight simultaneous equations.

$$RoiA \cdot C1 = M \times RoiR \cdot C1$$

$$RoiA \cdot C2 = M \times RoiR \cdot C2$$

$$RoiA \cdot C3 = M \times RoiR \cdot C3$$

$$RoiA \cdot C4 = M \times RoiR \cdot C4$$

The geometric transformation matrix M is as shown in FIG. 9, and h1 to h8 are unknown.

RoiX.Cn is a position vector $((x, y, 1)^T$, if coordinates are x, y) of the corner point n of the subject-of-interest region.

(Blur PSF Estimation Process)

Figure 10:
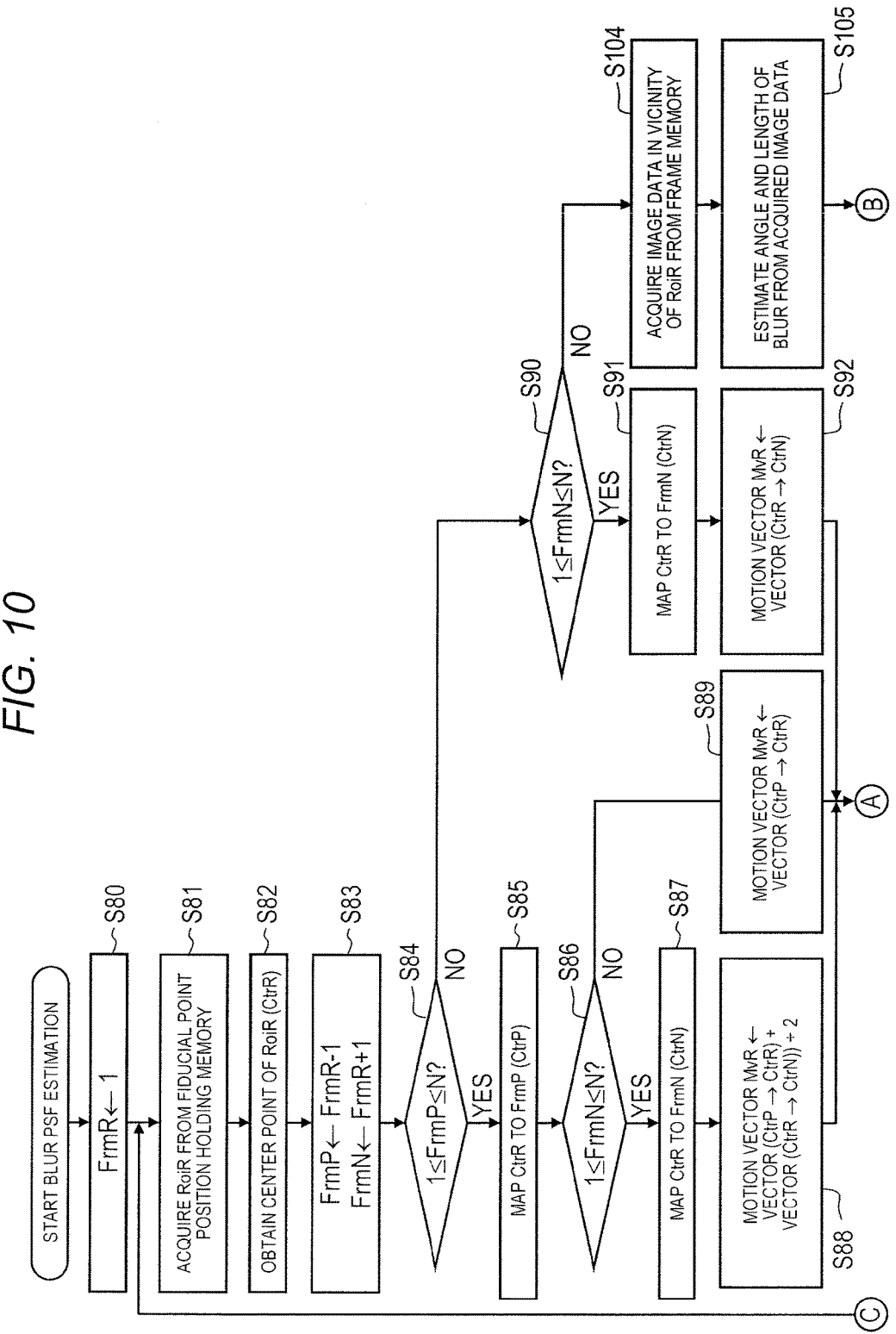
FIG. 10 is a flowchart for explaining a blur PSF estimation process in the super-resolution process of the image processing device according to Exemplary Embodiment 1.
Figure 11:
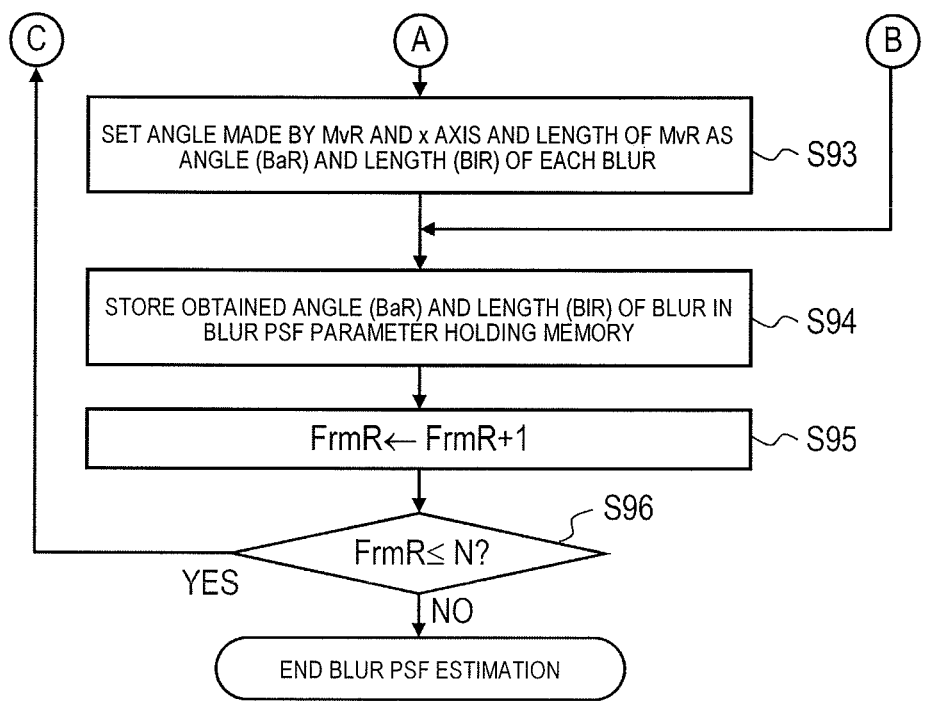
FIG. 11 is a flowchart for explaining blur PSF estimation process in the super-resolution process of the image processing device according to Exemplary Embodiment 1.

FIG. 10 and FIG. 11 are flowcharts for explaining blur PSF estimation process. In the blur PSF estimation process, for each input frame, a motion vector is calculated based on the alignment result with the adjacent input frames and the length and direction of the motion vector are taken as the length and direction of the subject blur in the input frame.

In FIG. 10 and FIG. 11, first, "1" is set in FrmR (step S80). Subsequently, RoiR is acquired from fiducial point position holding memory 17A (step S81). Then, the center point (CtrR) of the acquired RoiR is obtained (step S82). Subsequently, the value of FrmR is decremented by "1", the obtained value is set in FrmP, "1" is added to the value of FrmR, and the obtained value is set in FrmN (step S83). Then, it is determined whether or not the value of FrmP is "1" or more and "N" or less (step S84). In a case where the value of FrmP is "1" or more and "N" or less (step S84: YES), CtrR is mapped to FrmP (CtrP) (step S85).

The calculation of the mapping in step S85 is $CtrP \leftarrow M_{FrmR \rightarrow FrmP} * CtrR$.

Here, $M_{FrmR \rightarrow FrmP} = M_{FrmA \rightarrow FrmP} * M_{FrmR \rightarrow FrmA} = M_{FrmP \rightarrow FrmA}^{-1} * M_{FrmR \rightarrow FrmA}$. $M_{FrmR \rightarrow FrmA}$ and $M_{FrmR \rightarrow FrmA}$ on the right side are acquired from fiducial point position holding memory 17A.

After mapping CtrR to FrmP, it is determined whether or not the value of FrmN is "1" or more and "N" or less (step S86). In a case where the value of FrmP is "1" or more and "N" or less (step S86: YES), CtrR is mapped to FrmN (CtrN) (step S87). The calculation of the mapping in step S87 is the same as that in step S85.

Subsequently, the value of (vector (CtrP→CtrR)+vector (CtrR→CtrN))÷2 is set to motion vector MvR (step S88).

On the other hand, in a case where it is determined in step S86 that the value of FrmN is less than "1" or more than "N" (step S86: NO), the vector (CtrP→CtrR) is set to motion vector MvR (step S89).

In a case where it is determined in step S84 that the value of FrmP is less than "1" or more than "N" (step S84: NO), it is determined whether or not the value of FrmN is "1" or more and "N" or less (step S90). In a case where the value of FrmN is "1" or more and "N" or less (step S90: YES), CtrR is mapped to FrmN (CtrN) (step S91). The calculation of the mapping in step S91 is the same as that in step S85.

Subsequently, the value of the vector (CtrR→CtrN) is set to motion vector MvR (step S92).

After performing any one of step S88, step S89, and step S92, the angle made by MvR and the x axis and the length of MvR are set as the angle (BaR) and length (BlR) of blur (step S93). The obtained angle (BaR) and length (BlR) of blur are stored in blur PSF parameter holding memory 17B (step S94). "1" is added to the value of FrmR, and the obtained value is set in FrmR (step S95).

Subsequently, it is determined whether or not FrmR is "N" or less (step S96). In a case where FrmR is "N" or less (step S96: YES), the process returns to step S81. On the other hand, in a case where FrmR is more than "N" (step S96: NO), blur PSF estimation process is ended.

On the other hand, in a case where it is determined in step S90 that the value of FrmN is less than "1" or more than "N" (step S90: NO), image data in the vicinity of RoiR is acquired from frame memory 11 (step S104), the angle (BaR) and length (BlR) of blur is estimated from the acquired image data (step S105). Thereafter, the process proceeds to step S94.

(Parameter Adjustment Process in Fiducial Frame)

Figure 12:
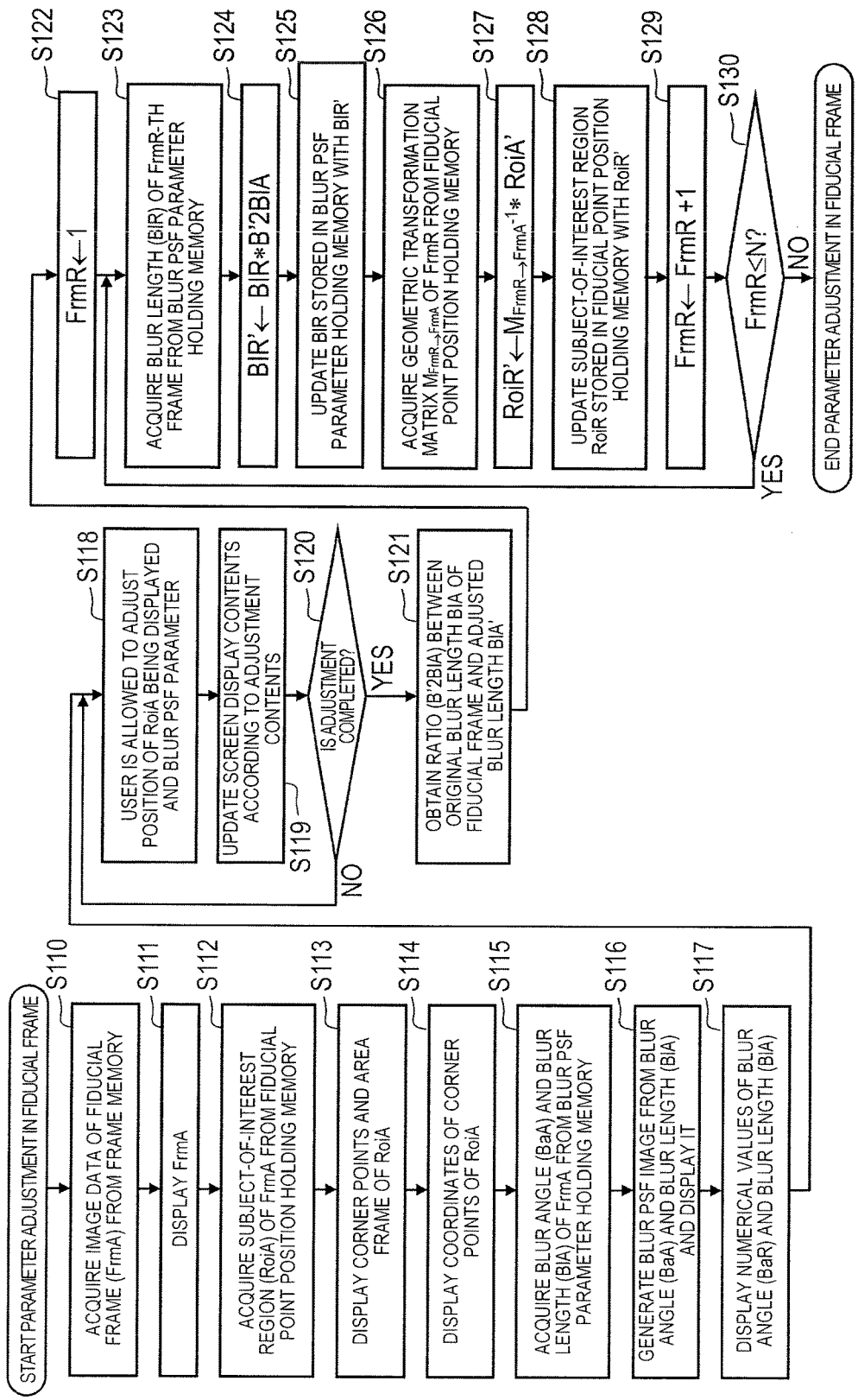
FIG. 12 is a flowchart for explaining a parameter adjustment process in a fiducial frame in the super-resolution process of the image processing device according to Exemplary Embodiment 1.

FIG. 12 is a flowchart for explaining a parameter adjustment process in a fiducial frame. In FIG. 12, first, image data of a fiducial frame (FrmA) is acquired from frame memory 11 (step S110), and is displayed (step S111). Subsequently, the subject-of-interest region (RoiA) of FrmA is acquired from fiducial point position holding memory 17A (step S112), and the obtained corner point and area frame of RoiA are displayed (step S113). The coordinates of the corner point of RoiA are displayed (step S114).

Subsequently, the blur angle (BaA) and blur length (BlA) of FrmA are acquired from blur PSF parameter holding memory 17B (step S115), and a blur PSF image is generated from the acquired blur angle (BaA) and blur length (BlA) (step S116). The numerical values of blur angle (BaA) and blur length (BlA) are displayed (step S117).

Then, the user is allowed to adjust the position of RoiA being displayed and blur PSF parameter (step S118). That is, an instruction to adjust the position of RoiA being displayed and blur PSF parameter is issued to the user. Thus, when the user adjusts the position of RoiA and blur PSF parameter, the screen display contents are updated according to the adjustment contents (step S119). Then, it is determined whether or not the adjustment by the user is completed (step S120). In a case where the adjustment is not completed (step S120: NO), the process returns to step S118, and in a case where the adjustment is completed (step S120: YES), a ratio (B'2BlA) between the original blur length BlA of the fiducial frame and the adjusted blur length BlA' is obtained (step S121).

Subsequently, "1" is set in FrmR (step S122). Blur length (BlR) of the FrmR-th frame is acquired from blur PSF parameter holding memory 17B (step S123), BlR*B'2BlA is calculated, and the result is set to BlR' (step S124). Subsequently, BlR stored in blur PSF parameter holding memory 17B is updated with BlR' (step S125). Subsequently, the geometric transformation matrix $M_{FrmR \rightarrow FrmA}$ of FrmR is acquired from fiducial point position holding memory 17A (step S126), $M_{FrmR \rightarrow FrmA}^{-1}$ is calculated, and the result is set as RoiR' (step S127).

Here, RoiA' is the position of RoiA at the time when the adjustment is completed by the user.

Further, $RoiR' \leftarrow M_{FrmR \rightarrow FrmA}^{-1} \times RoiA'$ is expressed by $$RoiR' \cdot C1 \leftarrow M_{FrmR \rightarrow FrmA}^{-1} \times RoiA' \cdot C1$$

$$RoiR' \cdot C2 \leftarrow M_{FrmR \rightarrow FrmA}^{-1} \times RoiA' \cdot C2$$

$$RoiR' \cdot C3 \leftarrow M_{FrmR \rightarrow FrmA}^{-1} \times RoiA' \cdot C3$$

$$RoiR' \cdot C4 \leftarrow M_{FrmR \rightarrow FrmA}^{-1} \times RoiA' \cdot C4,$$

and thus the coordinates obtained by mapping each corner coordinate of RoiA' by the geometric transformation matrix $M_{FrmR \to FrmA}^{-1}$ are calculated. In a case where the automatic alignment process is not performed, the calculation is performed by considering $M_{FrmR \to FrmA}^{-1}$ as a unit matrix.

Subsequently, the subject-of-interest region RoiR stored in fiducial point position holding memory 17A is updated with RoiR' (step S128). Subsequently, "1" is added to the value of FrmR, and the obtained value is set in FrmR (step S129). It is determined whether or not FrmR is "N" or less (step S130). In a case where FrmR is "N" or less (step S130: YES), the process returns to step S123. In a case where FrmR is more than "N" (step S130: NO), the parameter adjustment process in the fiducial frame is ended.

The process of step S121 to step S130 (that is, a series of processes after completion of the adjustment by the user) greatly reduces the subsequent work required for the individual adjustment of the reference frame.

Other parameters stored in blur PSF parameter holding memory 17B (the size and shape of focus bokeh, intensity setting at the time of bokeh removal, or the like) may be displayed and the user may be allowed to change the setting values.

Figure 13A:
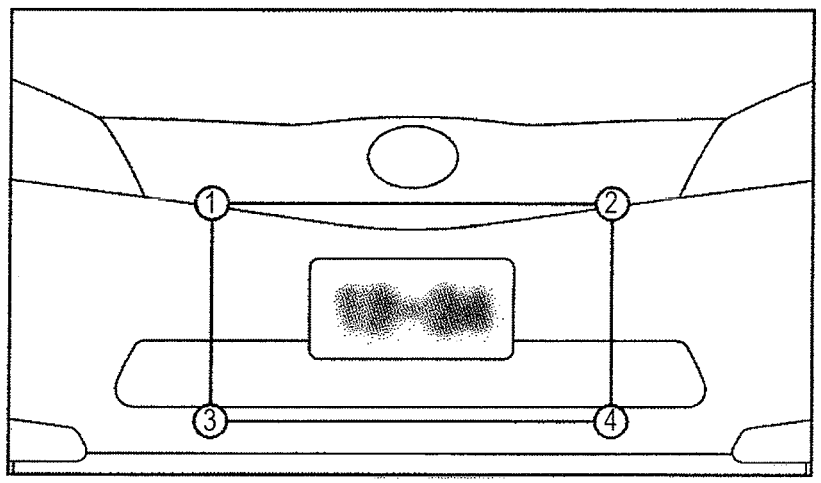
FIG. 13A is a diagram showing an example of a user interface screen before parameter adjustment in the fiducial frame.
Figure 13B:
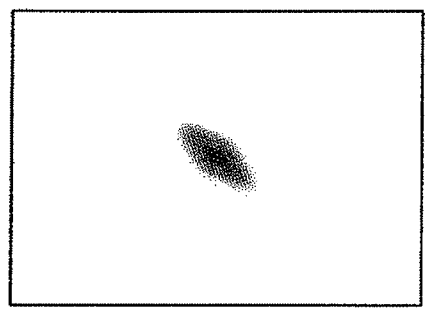
FIG. 13B is a diagram showing an example of the user interface screen before parameter adjustment in the fiducial frame.

FIG. 13A and FIG. 13B are diagrams showing an example of a user interface screen before parameter adjustment in the fiducial frame. FIG. 13A is an image of a fiducial frame, and FIG. 13B is a blur PSF image. In the adjustment of a fiducial frame, the positions of four points (point 1 to point 4) which are the reference of alignment in the fiducial frame. For example, in the initial state, an operation of moving each of the points (point 1 to point 4) placed at the four corners of the subject-of-interest region to the four corners of number plate 100 in the subject-of-interest region is performed. Before adjustment of the blur angle and blur length which are blur PSF parameters, a blur PSF image is laterally longer than the actual blur length, when the blur removal is applied as it is, overcorrection occurs and noise is generated.

Figure 14A:
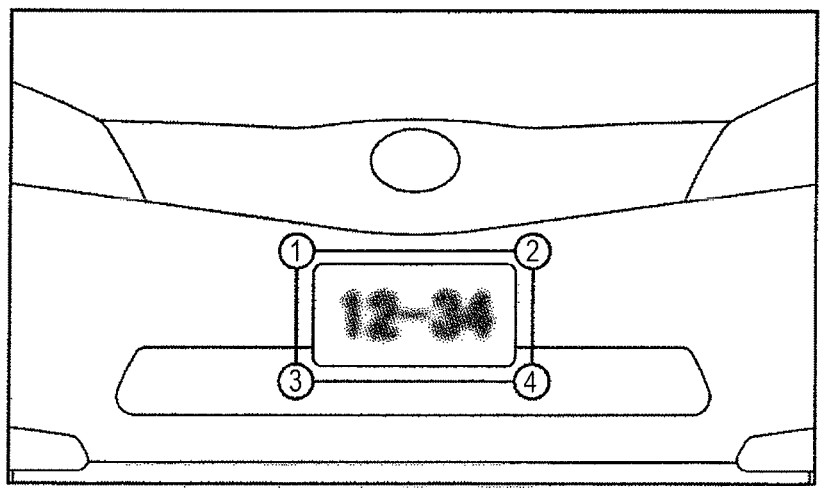
FIG. 14A is a diagram showing an example of the user interface screen after parameter adjustment in the fiducial frame.
Figure 14B:
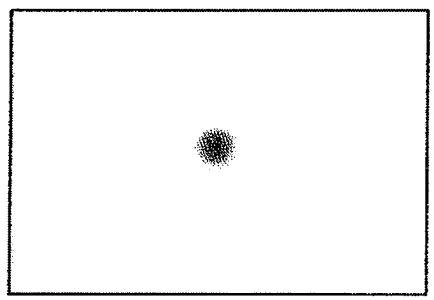
FIG. 14B is a diagram showing an example of the user interface screen after parameter adjustment in the fiducial frame.

FIG. 14A and FIG. 14B are diagrams showing an example of a user interface screen after parameter adjustment in the fiducial frame. FIG. 14A is an image of a fiducial frame, and FIG. 14B is a blur PSF image. In the initial state, the points (point 1 to point 4) placed at the four corners of the subject-of-interest region are located at the four corners of the number plate 100 in the subject-of-interest region. Since the blur angle and the blur length which are blur PSF parameters are adjusted, a blur PSF image is a rough point, an appropriate blur length is set, and the blur removal result becomes good.

(Parameter Adjustment Process in Reference Frame)

Figure 16:
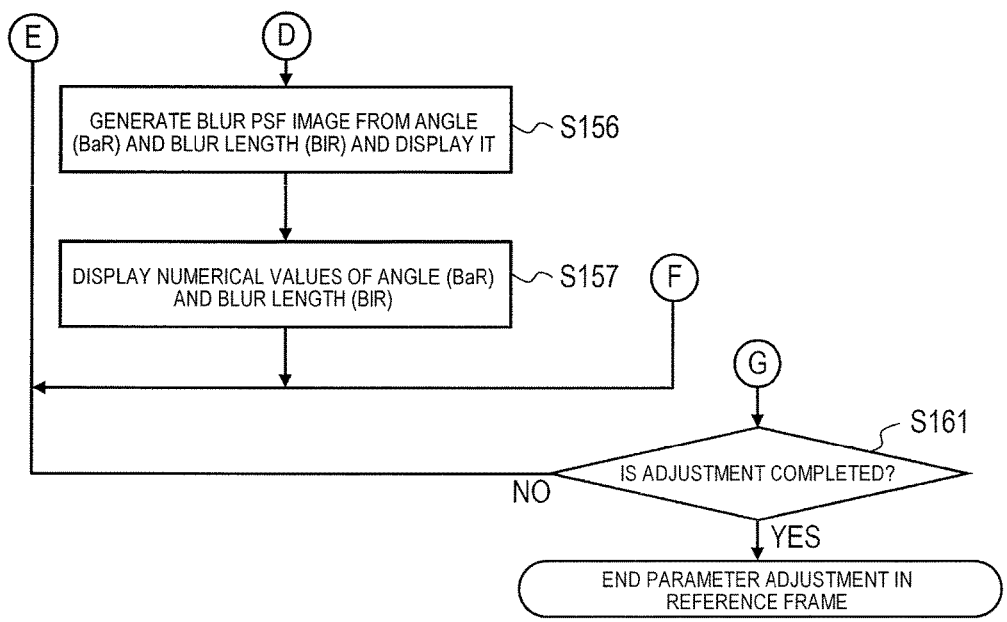
FIG. 16 is a flowchart for explaining the parameter adjustment process in the reference frame in the super-resolution process of the image processing device according to Exemplary Embodiment 1.

FIG. 15 and FIG. 16 are flowcharts for explaining a parameter adjustment process in a reference frame. In FIG. 15 and FIG. 16, first, image data of a fiducial frame (FrmA) is acquired from frame memory 11 (step S140), and is displayed (step S141). Subsequently, the subject-of-interest region (RoiA) of FrmA is acquired from fiducial point position holding memory 17A (step S142). The corner point and area frame of the acquired subject-of-interest region (RoiA) is displayed (step S143). The coordinates of the corner point of RoiA are displayed (step S144). A list of all the frames stored in frame memory 11 is displayed (step S145). A frame of the subject-of-interest region is displayed in each frame displayed in the frame list (step S146).

Subsequently, any one frame is brought into a selection state (step S147), and the user is allowed to perform selection change of a reference frame and parameter adjustment of reference frame being selected (step S148). That is, an instruction to change the selection of the reference frame and adjust the parameter for the reference frame being selected is issued to the user. Thus, the user changes the selection of the reference frame and adjusts the parameter for the reference frame being selected. Subsequently, it is determined whether or not the selection state of the reference frame is changed (step S149). In a case where the selection state of the reference frame is changed (step S149: YES), image data of the reference frame (FrmR) being selected is acquired from frame memory 11 (step S150) and is displays (step S151).

After FrmR is displayed, the subject-of-interest region (RoiR) of FrmR is acquired from fiducial point position holding memory 17A (step S152). The obtained corner point and area frame of RoiR are displayed (step S153), and the coordinates of the corner point of RoiR are displayed (step S154). The blur angle (BaR) and blur length (BlR) of FrmR are acquired from blur PSF parameter holding memory 17B (step S155), and a blur PSF image is generated from blur angle (BaR) and blur length (BlR) and displayed (step S156). The numerical values of blur angle (BaR) and blur length (BlR) are displayed (step S157). Thereafter, the process returns to step S148.

On the other hand, in a case where it is determined in step S149 that the selection state of the reference frame has not been changed (step S149: NO), it is determined whether or not RoiR or blur PSF parameter has been changed (step S158). In a case where RoiR or blur PSF parameter is changed (step S158: YES), the screen display contents are updated according to the adjustment contents (step S159). The set values of fiducial point position holding memory 17A and blur PSF parameter holding memory 17B with respect to the reference frame (FrmR) being selected are changed (step S160), according to the adjustment contents. Thereafter, the process returns to step S148.

In a case where it is determined in step S158 that the RoiR or blur PSF parameter is not changed (step S158: NO), it is determined whether or not the adjustment is completed (step S161). In a case where the adjustment is not completed (step S161: NO), the process returns to step S148. In a case where the adjustment is completed (step S161: YES), the parameter adjustment process in the reference frame is ended.

Figure 17A:
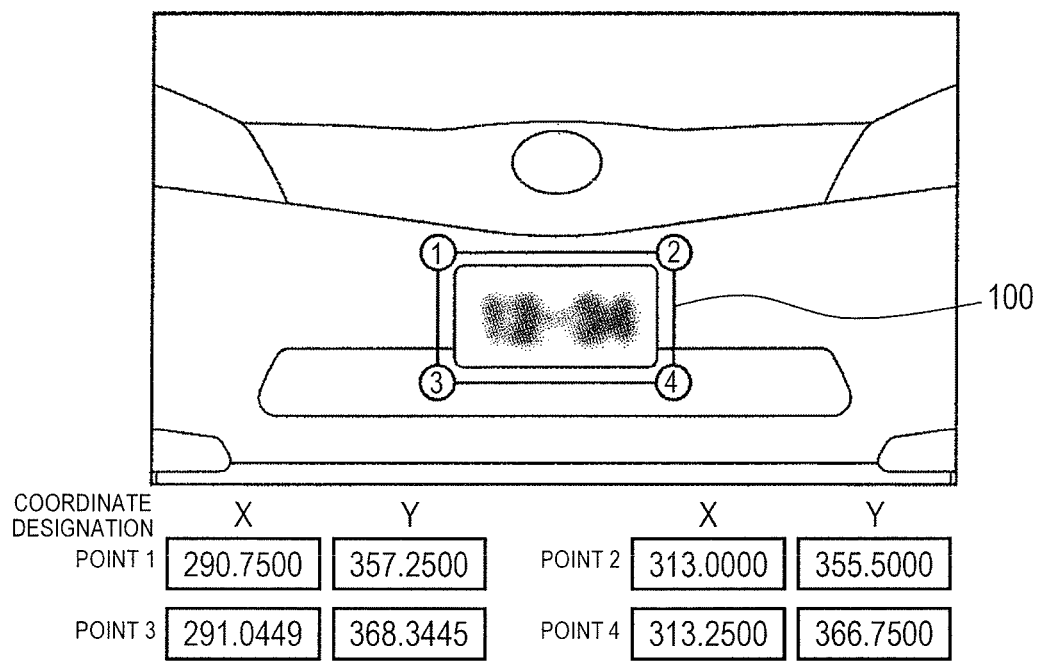
FIG. 17A is a diagram showing an example of a user interface screen before parameter adjustment in the reference frame.
Figure 17B:
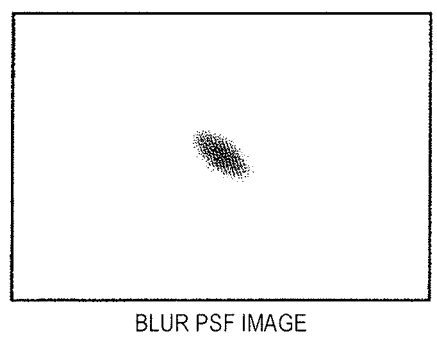
FIG. 17B is a diagram showing an example of the user interface screen before parameter adjustment in the reference frame.

FIGS. 17A and 17B show an example of a user interface screen before parameter adjustment in the reference frame. FIG. 17A shows an image of an input frame (reference frame) being selected, and FIG. 17B shows a blur PSF image in the input frame (reference frame) being selected. In the adjustment of the reference frame, the positions of four points (point 1 to point 4) with respect to the fiducial point set in the fiducial frame is adjusted for each of all frames before and after the fiducial frame. Since the fiducial points set in the fiducial frame are used in the adjustment of the reference frame, the fiducial points almost coincide with the fiducial frame even before adjustment, such that the positions of four points (point 1 to point 4) are almost positioned at the four corners of number plate 100. As a result, the positions of four points (point 1 to point 4) can be located at the four corners of number plate 100 in a short time. Of the four points (point 1 to point 4) before adjustment, the coordinates of point 1 are "X=290.7500, Y=357.2500", the coordinates of point 2 are "X=313.0000, Y=355.5000", the coordinates of point 3 are "X=291.0449, Y=368.3445", the coordinates of the point 4 are "X=313.2500, Y=366.7500".

Since the blur angle and the blur length, which are blur PSF parameters, also substantially coincide with the adjustment in the fiducial frame, the blur length is previously adjusted to an appropriate length.

Figure 18A:
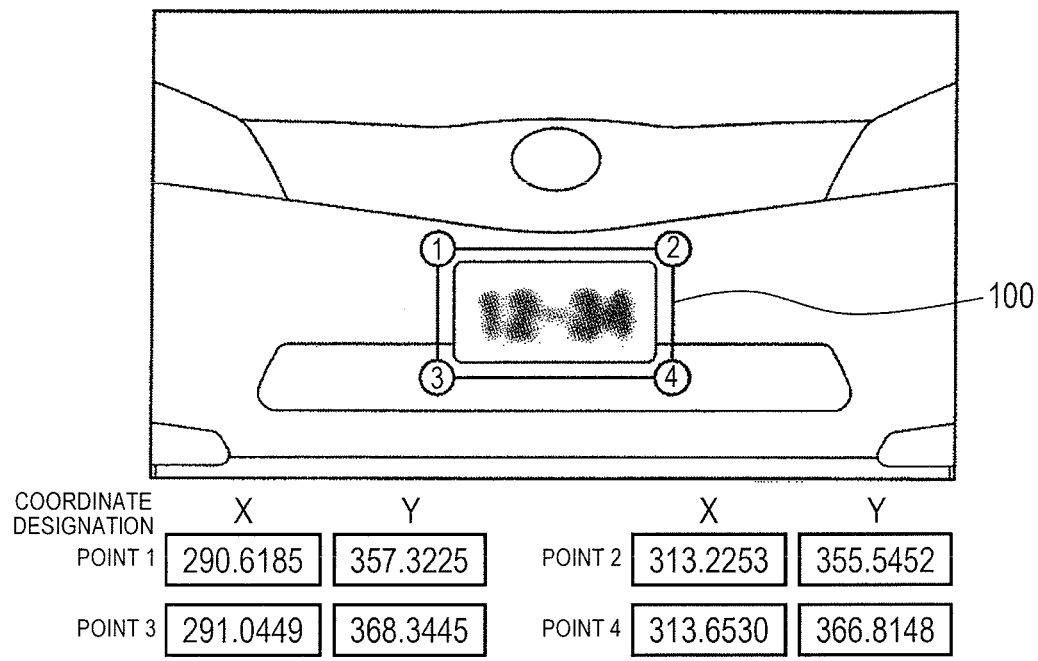
FIG. 18A is a diagram showing an example of a user interface screen after parameter adjustment in the reference frame.
Figure 18B:
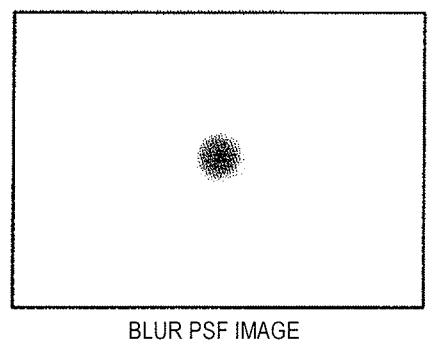
FIG. 18B is a diagram showing an example of the user interface screen after parameter adjustment in the reference frame.

FIGS. 18A and 18B show an example of a user interface screen after parameter adjustment in the reference frame. FIG. 18A shows an image of an input frame (reference frame) being selected, and FIG. 18B shows a blur PSF image in the input frame (reference frame) being selected. It is possible to complete the position adjustment of four points (point 1 to point 4) with respect to the fiducial point set in the fiducial frame in a very short time. Of the four points (point 1 to point 4) after adjustment shown in FIG. 18A, the coordinates of the point 1 are "X=290.6185, Y=357.3225", the coordinates of the point 2 are "X=313.2253, Y=355.5452" The coordinates of point 3 are "X=291.0449, Y=368.3445", the coordinates of point 4 are "X=313.6530, Y=366.8148", and the difference from the position of each point before parameter adjustment is small.

As described above, the position of the fiducial point of alignment in the fiducial frame and the blur PSF parameter such as the blur length can be adjusted, and the adjustment result in the fiducial frame can be reflected on all the other reference frames.

(Blur Removal Process)

Figure 19:
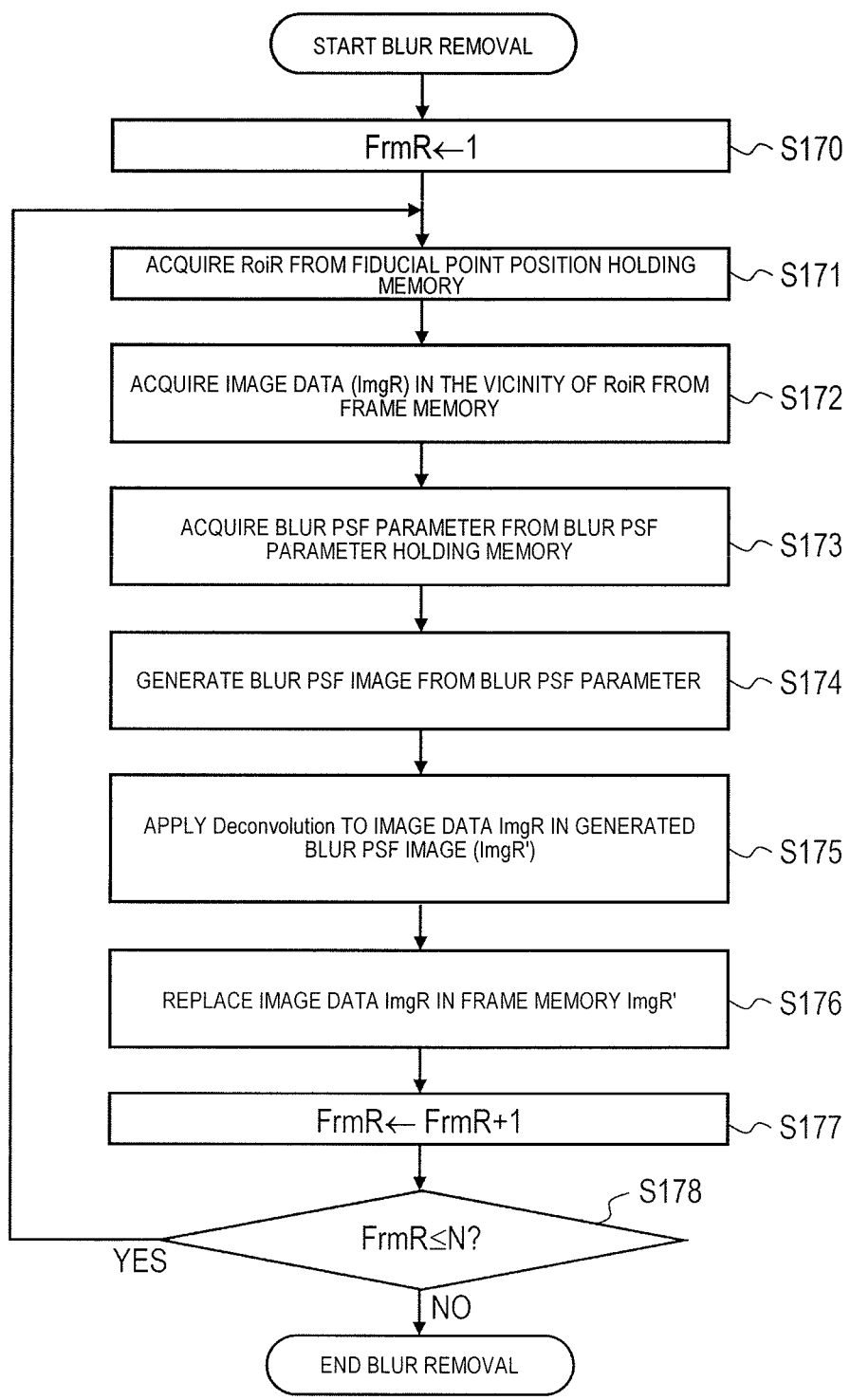
FIG. 19 is a flowchart for explaining the blur removal process in the super-resolution process of the image processing device according to Exemplary Embodiment 1.

FIG. 19 is a flowchart for explaining the blur removal process. In FIG. 19, first, "1" is set in FrmR (step S170). Subsequently, RoiR is acquired from fiducial point position holding memory 17A (step S171). Subsequently, the image data (ImgR) in the vicinity of the RoiR is acquired from frame memory 11 (step S172). Blur PSF parameter is acquired from blur PSF parameter holding memory 17B (step S173).

Blur PSF image is generated from acquired blur PSF parameter (step S174). The generation of blur PSF image will be described later in detail.

Then, Deconvolution is applied to the image data (ImgR) in the generated blur PSF image to obtain image data (ImgR') (step S175).

Known methods can be used for Deconvolution. Hereinafter, known examples will be given.

Inverse Filter
Utilizing the properties of the convolution operation and the Fourier transform, based on X×PSF=Y→FT(X) FT(PSF)=FT(Y)→FT(X)=FT(Y)/FT(PSF), an original image is restored.

(X: an original image without bokeh and blur, PSF: point spread function of bokeh and blur, Y: an observed image with bokeh and blur, *: convolution operation, FT(•): Fourier transform)

Wiener Filter

In the above modified version, the term of random noise is included in the model expression (X*PSF+W=Y), and the adverse effect is suppressed (W: random noise component).

W. H. Richardson, " Bayesian-Based Iterative Method of Image Restoration", Journal of Optical Society of America, Vol. 62, No. 1, 1972 A method of repeating a process of obtaining the next X from the values of X, PSF and Y, with the initial solution of X, and updating X iteratively until X converges, it does not depend on the Fourier transform.

After obtaining image data (ImgR'), image data (ImgR) in frame memory 11 is replaced with image data (ImgR') (step S176). "1" is added to the value of FrmR, and the obtained value is set in FrmR (step S177). Thereafter, it is determined whether or not the value of FrmR is "N" or less (step S178). In a case where the value of FrmR is "N" or less (step S178: YES), the process returns to step S171. In a case where the value of FrmR is more than "N" (step S178: NO), the blur removal process is ended.

An example of generating a blur PSF image from blur PSF parameter (blur angle BaR and blur length BlR) will be described below. 1. Prepare image data of a size enough to fit the trajectory of blur, and initialize it with 0. 2.With the center of the prepared image as the origin, the pixel value of the image data positioned at each point on a line segment which passes through the origin and whose angle with the x axis is BaR, and the length is BlR (the middle point of the line segment is equal to the origin point) is rewritten to 1.0 (=maximum brightness level). 3. Normalize all pixel values of image data uniformly such that the sum of the pixel values becomes 1.0.

Further, in the case where blur PSF parameter includes a bokeh radius BrR (parameter indicating the blurring condition of the blur trajectory, and used for sharpening the image that is out of focus), the following steps are added. 4. Convolve the generated image data with true circle data of a radius BrR.

True circle data: point within radius BrR from center=pixel value K. and other points=pixel value 0

K: 1/(the total number of points within the radius BrR from the center)

(Reconfiguration Process)

Figure 20:
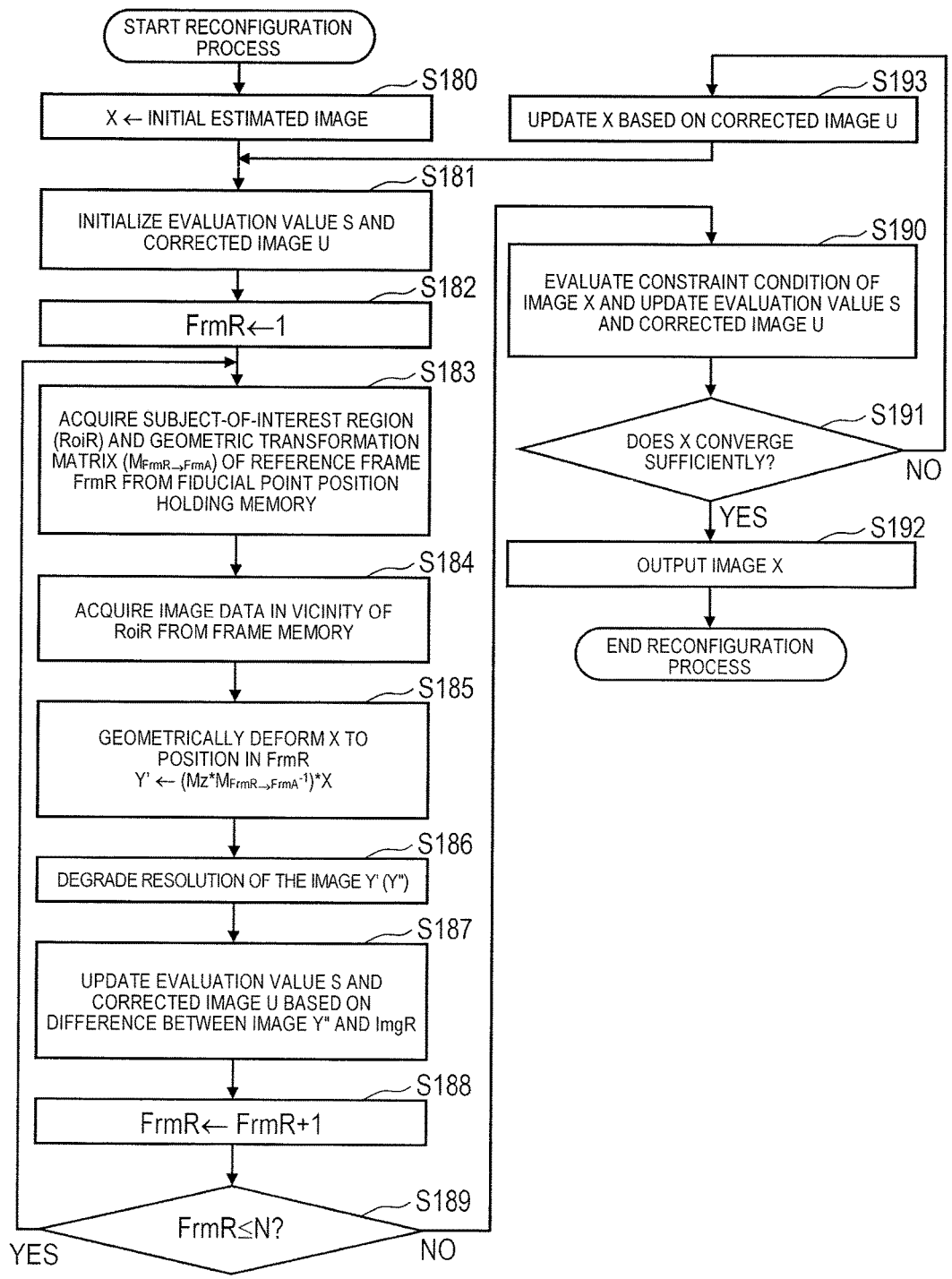
FIG. 20 is a flowchart for explaining a reconfiguration process in the super-resolution process of the image processing device according to Exemplary Embodiment 1.

FIG. 20 is a flowchart for explaining the reconfiguration process. In FIG. 20, first, an initial estimated image is set to X (step S180). Any enlargement method may be used as long as the initial estimation image is the image obtained by enlarging the image of the subject-of-interest region of the fiducial frame by z times in the vertical and horizontal directions.

Subsequently, evaluation value S and corrected image U are initialized (step S181), and thereafter "1" is set in FrmR (step S182). Subsequently, the subject-of-interest region (RoiR) and geometric transformation matrix ($M_{FrmR \to FrmA}$) of reference frame FrmR are acquired from fiducial point position holding memory 17A (step S183). The image data (ImgR) in the vicinity of the RoiR is acquired from frame memory 11 (step S184).

Figure 21:
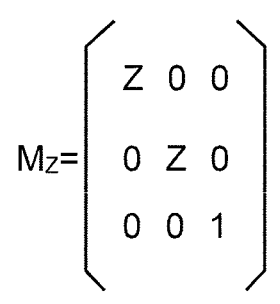

Subsequently, the image X is geometrically deformed to a position in FrmR (step S185). That is, $(Mz^* M_{FrmR \to FrmA}^{-1})^* X$ is calculated, and the result is set to image Y' ($Y' \leftarrow (Mz^* M_{FrmR \to FrmA}^{-1})^* X$). Here, Mz is an expansion transformation matrix (when super-resolution magnification is z, it becomes as shown in FIG. 21).

After the image X is geometrically deformed to the position in FrmR, the resolution of the image Y' is degraded (Y'') (step S186). Evaluation value S and corrected image U are updated based on the difference between the image Y'' and ImgR (step S187). Thereafter, "1" is added to the value of FrmR, and the obtained value is set in FrmR (step S188). It is determined whether or not the value of FrmR is "N" or less (step S189). In a case where the value of FrmR is "N" or less (step S189: YES), the process returns to step S183. In a case where the value of FrmR is more than "N" (step S189: NO), the constraint condition of the image X is evaluated, and evaluation value S and corrected image U are updated (step S190). It is determined whether or not X has converged sufficiently (step S191). In a case where the convergence is sufficient (step S191: YES), the image X is output (step S192), and the reconfiguration process is ended. On the other hand, in a case where X does not sufficiently converge (step S191: NO), X is updated based on corrected image U (step S193), and the process returns to step S181.

(Effect)

As described above, in the present exemplary embodiment, image processing device 1 displays the image and parameter for the fiducial frame (the position of the subject-of-interest region, and blur PSF parameter), updates the display contents of the image of the fiducial frame based on the adjustment by the user, and stores the adjusted parameter as the parameter for the fiducial frame. Then, when displaying the image of the next reference frame, image processing device 1 displays the stored parameter for the fiducial frame as the parameter for the reference frame, and updates the display contents of the image of the reference frame based on the adjustment by the user, and stores the adjusted parameter as the parameter for the reference frame. Thereafter, when displaying the image of a new reference frame, image processing device 1 displays the parameter for the fiducial frame as the parameter for the new reference frame.

Thus, since the adjustment result in the fiducial frame can be reflected on all the other reference frames, in a case of manually aligning the images of a plurality of input frames, it is possible to reduce the input work, and improve work efficiency. As a result, since the number of frames that can be used for the super-resolution process increases, a high-resolution image can be obtained by the super-resolution process.

In Exemplary Embodiment 2, a blur PSF estimation process different from that described with reference to FIG. 10 and FIG. 11 in Exemplary Embodiment 1 will be described (Blur PSF Estimation Process)

Figure 22:
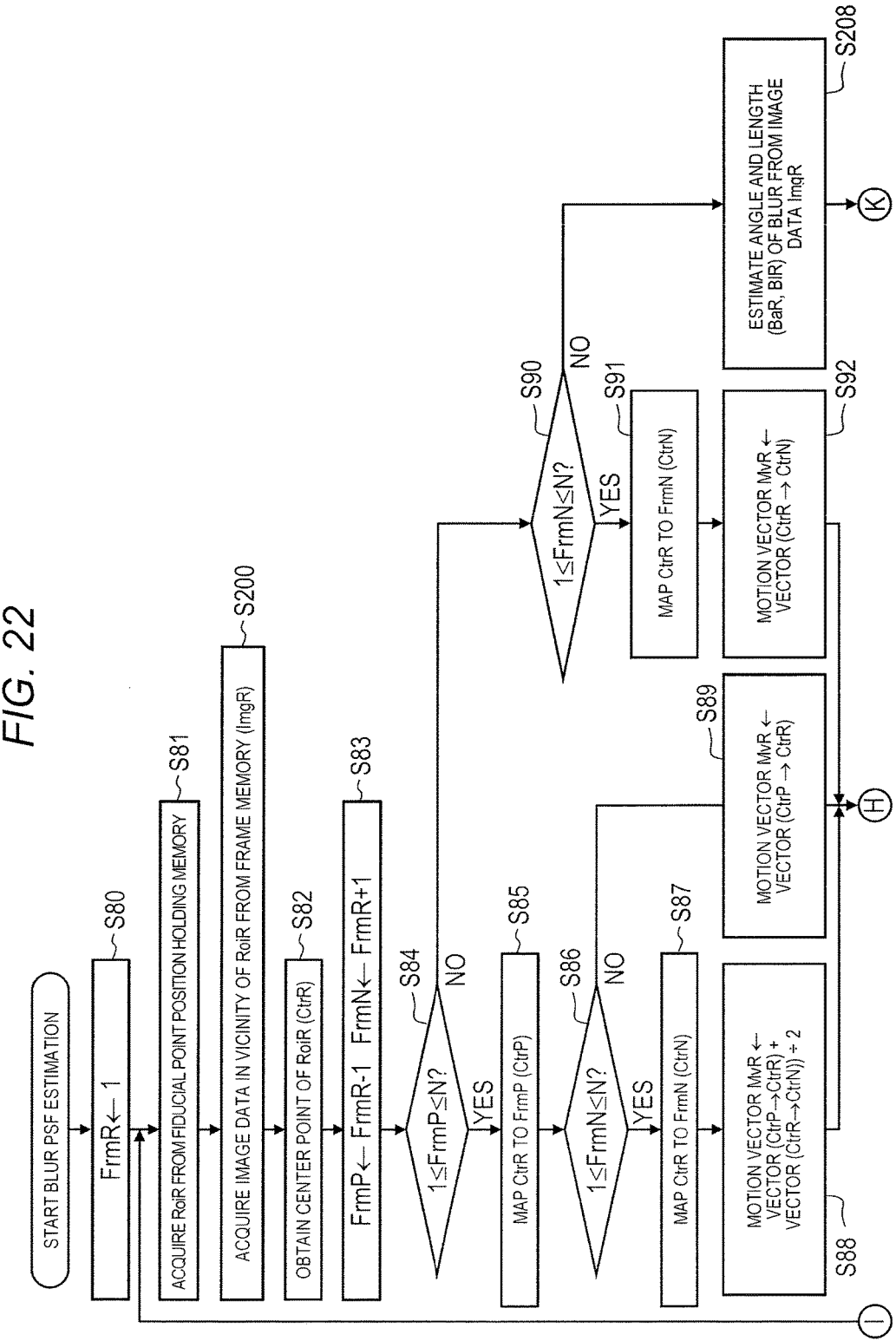
FIG. 22 is a flowchart for explaining blur PSF estimation process in the super-resolution process of the image processing device according to Exemplary Embodiment 2.
Figure 23:
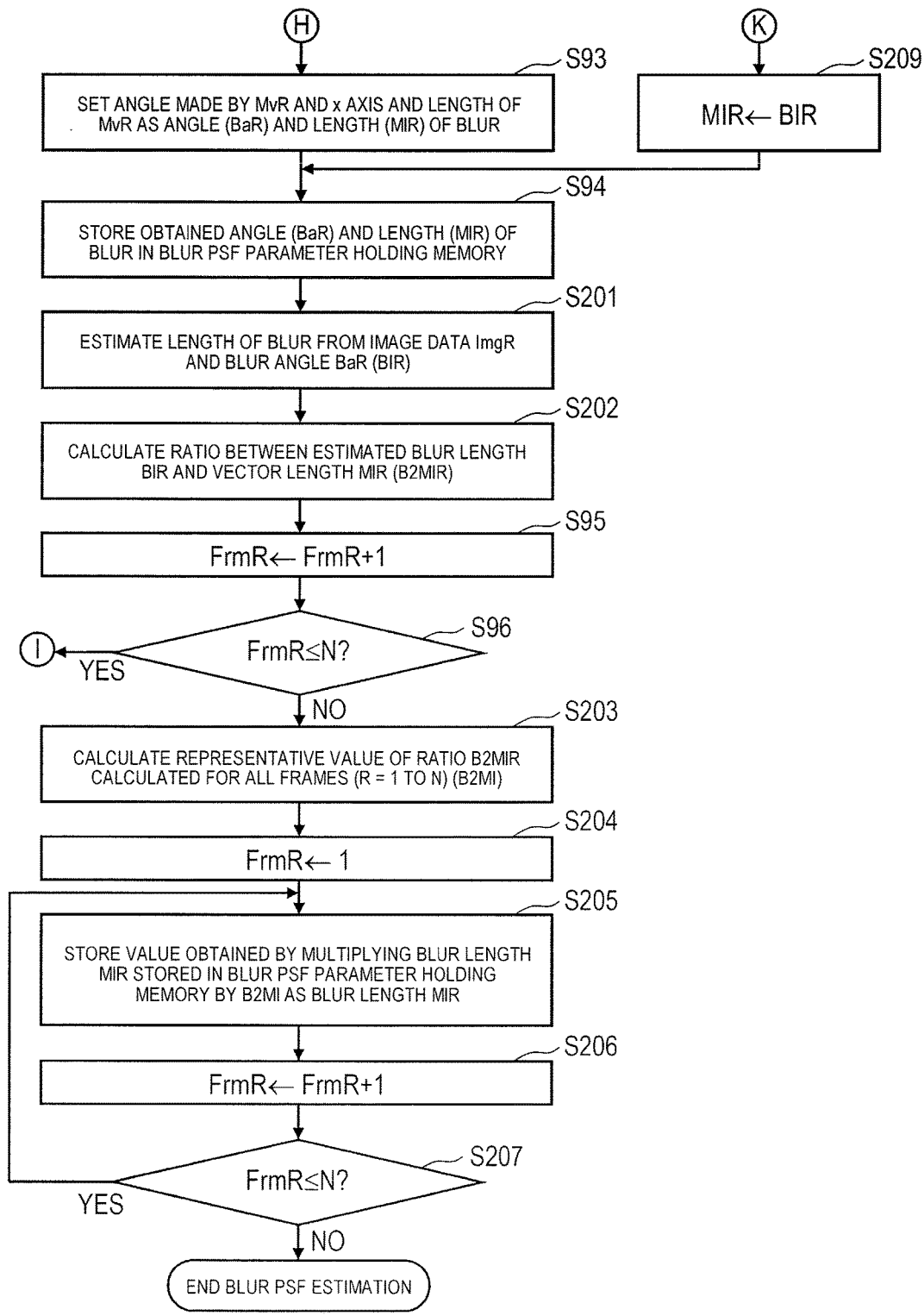
FIG. 23 is a flowchart for explaining blur PSF estimation process in the super-resolution process of the image processing device according to Exemplary Embodiment 2.

FIG. 22 and FIG. 23 are flowcharts for explaining blur PSF estimation process of image processing device 1 according to the present exemplary embodiment. In FIG. 22 and FIG. 23, steps common to those in FIG. 10 and FIG. 11 are denoted by the same reference numerals as those in FIG. 10 and FIG. 11, and a description thereof will be omitted.

In FIG. 22 and FIG. 23, first, "1" is set in FrmR (step S80). Subsequently, RoiR is acquired from fiducial point position holding memory 17A (step S81). The acquired image data (ImgR) in the vicinity of the RoiR is acquired from frame memory 11 (step S200). Subsequently, the center point (CtrR) of the acquired RoiR is obtained (step S82). Thereafter, the value of FrmR is decremented by "1", the obtained value is set in FrmP, "1" is added to the value of FrmR, and the obtained value is set in FrmN (step S83). Subsequently, it is determined whether or not the value of FrmP is "1" or more and "N" or less (step S84). In a case where the value of FrmP is "1" or more and "N" or less (step S84: YES), CtrR is mapped to FrmP (CtrP) (step S85).

After mapping CtrR to FrmP, it is determined whether or not the value of FrmN is "1" or more and "N" or less (step S86). In a case where the value of FrmP is "1" or more and "N" or less (step S86: YES), CtrR is mapped to FrmN (step S87). Subsequently, (vector (CtrP→CtrR)+vector (CtrR→CtrN))÷2 is calculated, and the result is set to motion vector MvR (step S88).

On the other hand, in a case where it is determined in step S86 that the value of FrmN is less than "1" or more than "N" (step S86: NO), the vector (CtrP→CtrR) is set to motion vector MvR (step S89).

In a case where the value of FrmP is less than "1" or more than "N" in step S84 (step S84: NO), it is determined whether or not the value of FrmN is "1" or more and "N" or less (step S90). In a case where the value of FrmN is "1" or more and "N" or less (step S90: YES), CtrR is mapped to FrmN (CtrN) (step S91). Subsequently, the value of vector (CtrR→CtrN) is set to motion vector MvR (step S92).

After performing any one of step S88, step S89, and step S92, the angle made by MvR and the x axis and the length of MvR are set as the angle (BaR) and length (MlR) of blur (step S93). Subsequently, the obtained angle (BaR) and length (MlR) of blur are stored in blur PSF parameter holding memory 17B (step S94). Subsequently, the length of blur is estimated from the image data ImgR and the blur angle BaR (BlR) (step S201). Then, the ratio between the estimated blur length BlR and the vector length MlR is calculated (B2MlR) (step S202).

Thereafter, "1" is added to the value of FrmR, and the obtained value is set in FrmR (step S95). It is determined whether or not FrmR is "N" or less (step S96). In a case where FrmR is "N" or less (step S96: YES), the process returns to step S81. On the other hand, in a case where FrmR is more than "N" (step S96: NO), a representative value of the ratio B2MlR calculated for all frames (R=1 to N) is calculated (B2Ml) (step S203). Thereafter, "1" is set in FrmR (step S204). Subsequently, a value obtained by multiplying blur length MlR stored in blur PSF parameter holding memory 17B by B2Ml is stored as blur length BlR (step S205). Subsequently, "1" is added to the value of FrmR, the obtained value is set in FrmR (step S206), and it is determined whether or not FrmR is "N" or less (step S207). In a case where FrmR is "N" or less (step S207: YES), the process returns to step S205. On the other hand, in a case where FrmR is more than "N" (step S207: NO), blur PSF estimation process is ended.

On the other hand, in a case where it is determined in step S90 that the value of FrmN is less than "1" or more than "N" (step S90: NO), the angle and length (BaR, BlR) of blur is estimated from image data ImgR (step S208). Thereafter, the value of BlR is set to MlR (step S209), and the process returns to step S94.

(Effect)

As described above, according to the present exemplary embodiment, when estimating the length of blur PSF in the blur PSF estimation process, the length of blur PSF is estimated from one piece of image data, a ratio between the estimated length of blur PSF and the length of the motion vector is calculated for each frame, the ratio is smoothed over all the frames, and the length of blur PSF of each frame is calculated by multiplying the length of each motion vector by the smoothed ratio. This makes it possible to estimate the length of blur PSF considering the shutter speed of the camera, so it is possible to perform a blur removal process with accurate blur PSF, and to obtain a sharp image without ringing noise.

(Exemplary Embodiment 3)

In Exemplary Embodiment 3, a description will be made about a case where the process contents described in Exemplary Embodiment 1 is applied to the detection of a facial image. The schematic configuration of the image processing device in the present exemplary embodiment is the same as image processing device 1 in FIG. 1 described in Exemplary Embodiment 1. The flow of the super-resolution process of the image processing device in the present exemplary embodiment is substantially the same as that shown in FIG. 2 and FIG. 3 described in Exemplary Embodiment 1. However, the automatic alignment process (S4) in FIG. 2 is changed to the face feature point detection process.

The flow of the image data reading process of the image processing device in the present exemplary embodiment is the same as that of FIG. 4 described in Exemplary Embodiment 1. The flow of the fiducial frame selection process of the image processing device in the present exemplary embodiment is the same as that of FIG. 5 and FIG. 6 described in Exemplary Embodiment 1. The flow of the subject-of-interest region setting process of the image processing device in the present exemplary embodiment is the same as that of FIG. 7 described in Exemplary Embodiment 1. The flow of the blur removal process of the image processing device in the present exemplary embodiment is the same as that of FIG. 19 described in Exemplary Embodiment 1.

(Face Feature Point Detection Process)

Figure 24:
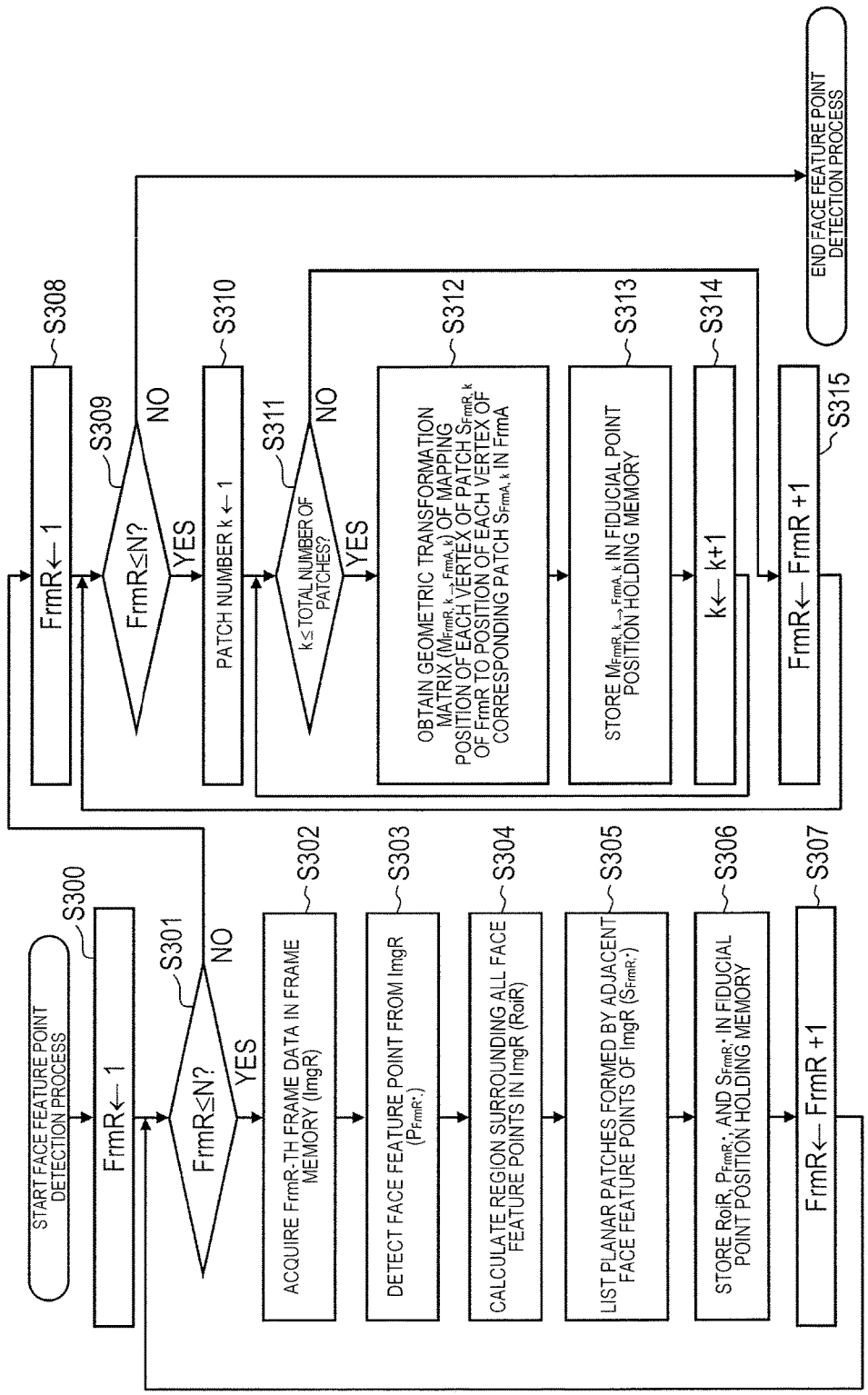
FIG. 24 is a flowchart for explaining an automatic alignment process in the super-resolution process of the image processing device according to Exemplary Embodiment 3.

FIG. 24 is a flowchart for explaining a face feature point detection process. In FIG. 24, first, "1" is set to the value of FrmR (step S300). Subsequently, it is determined whether or not the value of FrmR is "N" or less (step S301). In this determination, in a case where the value of FrmR is "N" or less (step S301: YES), the FrmR-th frame data in frame memory 11 is acquired (ImgR) (step S302). Subsequently, the face feature point is detected from ImgR ($P_{FrmR,i}$) (step S303). Note that $P_{FrmR,i}$ is the position information of the i-th face feature point detected in ImgR (1≤i≤(the total number of feature points in ImgR)).

Figure 25:
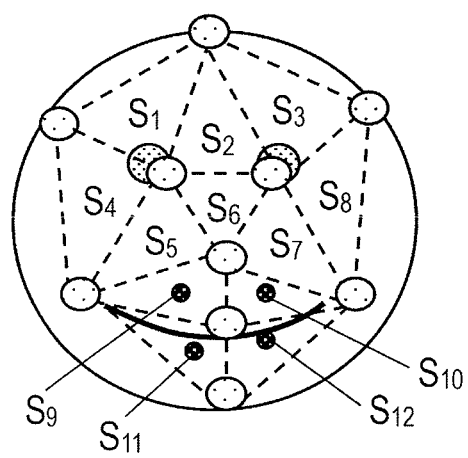
FIG. 25 is a diagram showing a planar patch formed by adjacent face feature points of ImgR.

Subsequently, a region surrounding all the face feature points in ImgR is calculated (RoiR) (step S304), and planar patches (see FIG. 25) formed by adjacent face feature points of ImgR are listed ($S_{FrmR,*}$) (step S305). In FIG. 25, O are face feature points, and regions of $S_1$ to $S_{12}$ surrounded by dotted lines are planar patches.

RoiR, $P_{FrmR,*}$, and $S_{FrmR,*}$ are stored in fiducial point position holding memory 17A (step S306). Thereafter, "1" is added to the value of FrmR, the obtained value is set in FrmR (step S307), and the process returns to step S301.

On the other hand, in a case where it is determined in step S301 that the value of FrmR is larger than N (step S301: NO), the value of FrmR is set to "1" (step S308). and it is determined whether or not the value of FrmR is "N" or less (step S309).

In this determination, in a case where the value of FrmR is "N" or less (step S309: YES), the patch number k is set to "1" (step S310), and it is determined whether or not the value of k is the total number of patches or less (step S311).

In this determination, in a case where the value of k is the total number of patches or less (step S311: YES), geometric transformation matrix ($M_{FrmR,k \to FrmA,k}$) of mapping the position of each vertex of the patch $S_{FrmR,k}$ of FrmR to the position of each vertex of the corresponding patch $S_{FrmA,k}$ in FrmA is obtained (step S312). Geometric transformation matrix $M_{FrmR,k \to FrmA,k}$ is stored in fiducial point position holding memory 17A (step S313). Thereafter, "1" is added to the value of k, and the obtained value is set to k (step S314), and the process returns to step S311.

On the other hand, in a case where it is determined in step S311 that the value of k is larger than the number of all patches (step S311: NO), "1" is added to the value of FrmR, the obtained value is set in FrmR (step S315), the process returns to step S309.

In a case where it is determined in step S309 that the value of FrmR is more than "N" (step S309: NO), the face feature point detection process is ended.

(Blur PSF Estimation Process)

Figure 26:
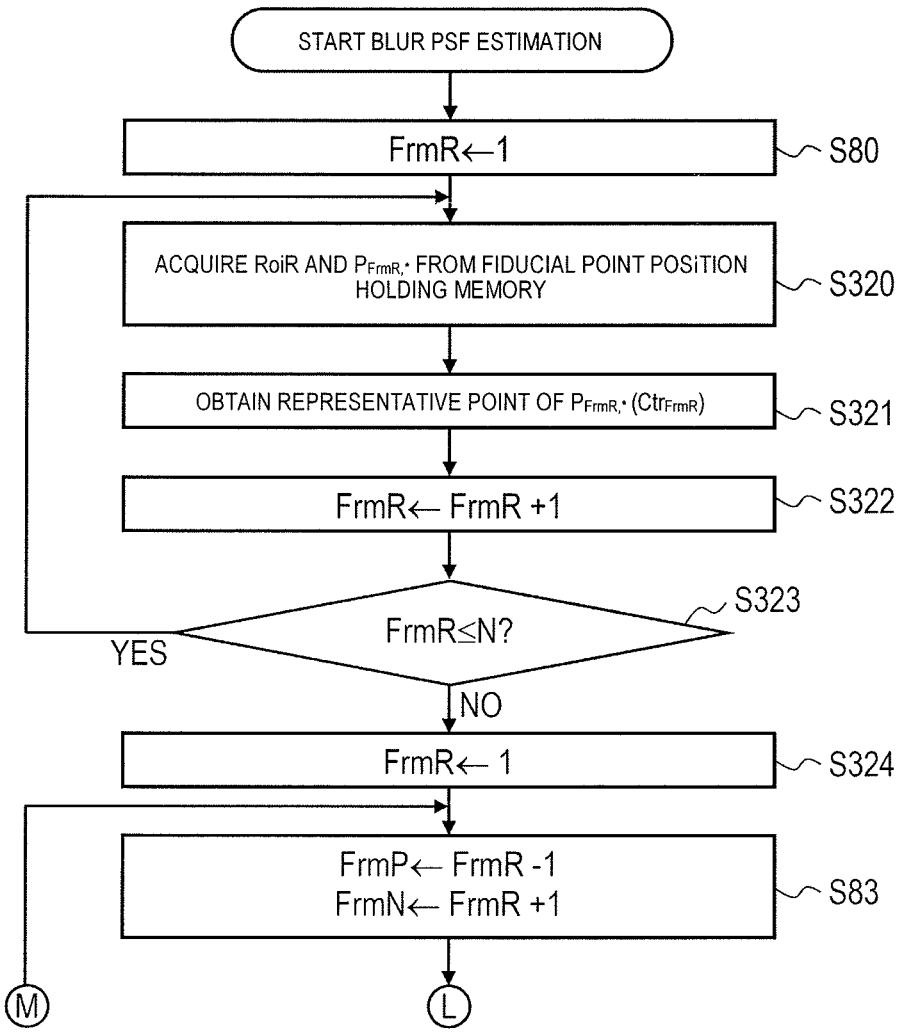
FIG. 26 is a flowchart for explaining blur PSF estimation process in the super-resolution process of the image processing device according to Exemplary Embodiment 3.
Figure 27:
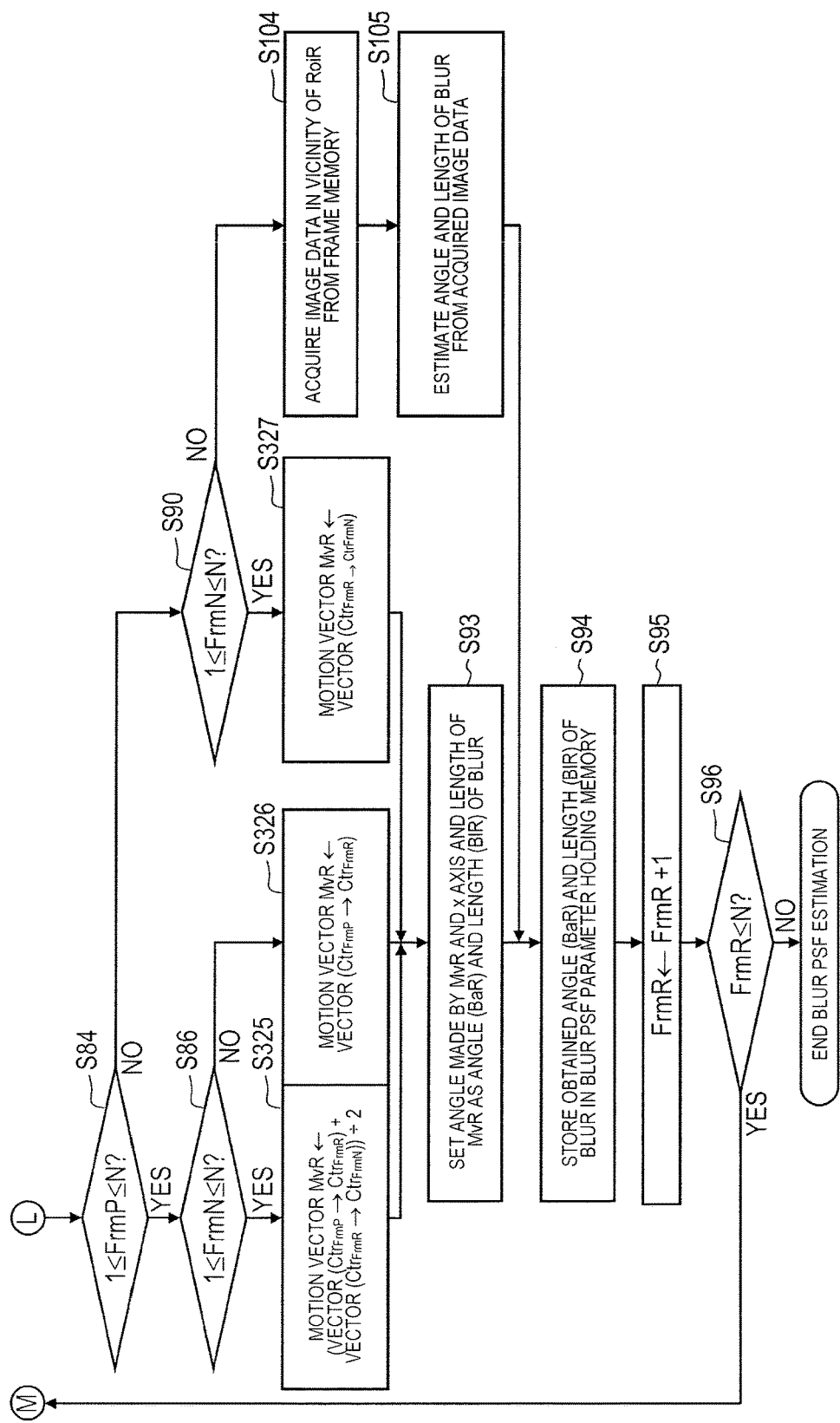
FIG. 27 is a flowchart for explaining blur PSF estimation process in the super-resolution process of the image processing device according to Exemplary Embodiment 3.

FIG. 26 and FIG. 27 are flowcharts for explaining a blur PSF estimation process. In FIG. 26 and FIG. 27, steps common to those in FIG. 10 and FIG. 11 are denoted by the same reference numerals as those in FIG. 10 and FIG. 11, and a description thereof will be omitted.

In FIG. 26 and FIG. 27, first, "1" is set in FrmR (step S80). Subsequently, $P_{FrmR,*}$ is acquired from fiducial point position holding memory 17A (step S320). The representative point of the acquired $P_{FrmR,*}$ is obtained ($Ctr_{FrmR}$) (step S321). Thereafter, "1" is added to the value of FrmR, and the obtained value is set in FrmR (step S322). Subsequently, it is determined whether or not the value of FrmR is "N" or less (step S323). In a case where the value of FrmR is "N" or less (step S323: YES), the process returns to step S320.

On the other hand, in a case where it is determined in step S323 that the value of FrmR is larger than "N" (step S323: NO), the value of FrmR is set to "1" (step S324).

Subsequently, the value of FrmR is decremented by "1", and the obtained value is set in FrmP; "1" is added to the value of FrmR, and the obtained value is set in FrmN (step S83). It is determined whether or not the value of FrmP is "N" or less (step S84). In a case where the value of FrmP is "1" or more and "N" or less (step S84: YES), the process returns to step S86.

Then, it is determined whether or not the value of FrmN is "1" or more and "N" or less (step S86). In a case where the value of FrmN is "1" or more and "N" or less (step S86: YES), the value of (vector ($Ctr_{FrmP} \to Ctr_{FrmR}$)+vector ($Ctr_{FrmR} \to Ctr_{FrmN}$))÷2 is set to motion vector MvR (step S325).

On the other hand, in a case where it is determined in step S86 that the value of FrmN is less than "1" or more than "N" (step S86: NO), the vector ($Ctr_{FrmP} \to Ctr_{FrmR}$) is set to motion vector MvR (step S326).

In a case where it is determined in step S84 that the value of FrmP is less than "1" or more than "N" (step S84: NO), it is determined whether or not the value of FrmN is "1" or more and "N" or less (step S90). In a case where the value of FrmN is "1" or more and "N" or less (step S90: YES), the value of vector (CtrFrmR→CtrFrmN) is set to motion vector MvR (step S327).

After performing any one of steps S325, S326, and S327, the angle made by MvR and the x axis and the length of MvR is set as the angle (BaR) and length (BlR) of blur (step S93). The obtained angle (BaR) and length (BlR) of blur are stored in blur PSF parameter holding memory 17B (step S94). "1" is added to the value of FrmR, and the obtained value is set in FrmR (step S95). Subsequently, it is determined whether or not FrmR is "N" or less (step S96). In a case where FrmR is "N" or less (step S96: YES), the process returns to step S83. On the other hand, in a case where FrmR is more than "N" (step S96: NO), blur PSF estimation process is ended.

On the other hand, in a case where it is determined in step S90 that the value of FrmN is less than "1" or more than "N" (step S90: NO), image data in the vicinity of RoiR is acquired from frame memory 11 (step S104), the angle (BaR) and length (BlR) of blur is estimated from the acquired image data (step S105). Thereafter, the process proceeds to step S94.

(Parameter Adjustment Process in Fiducial Frame)

Figure 28:
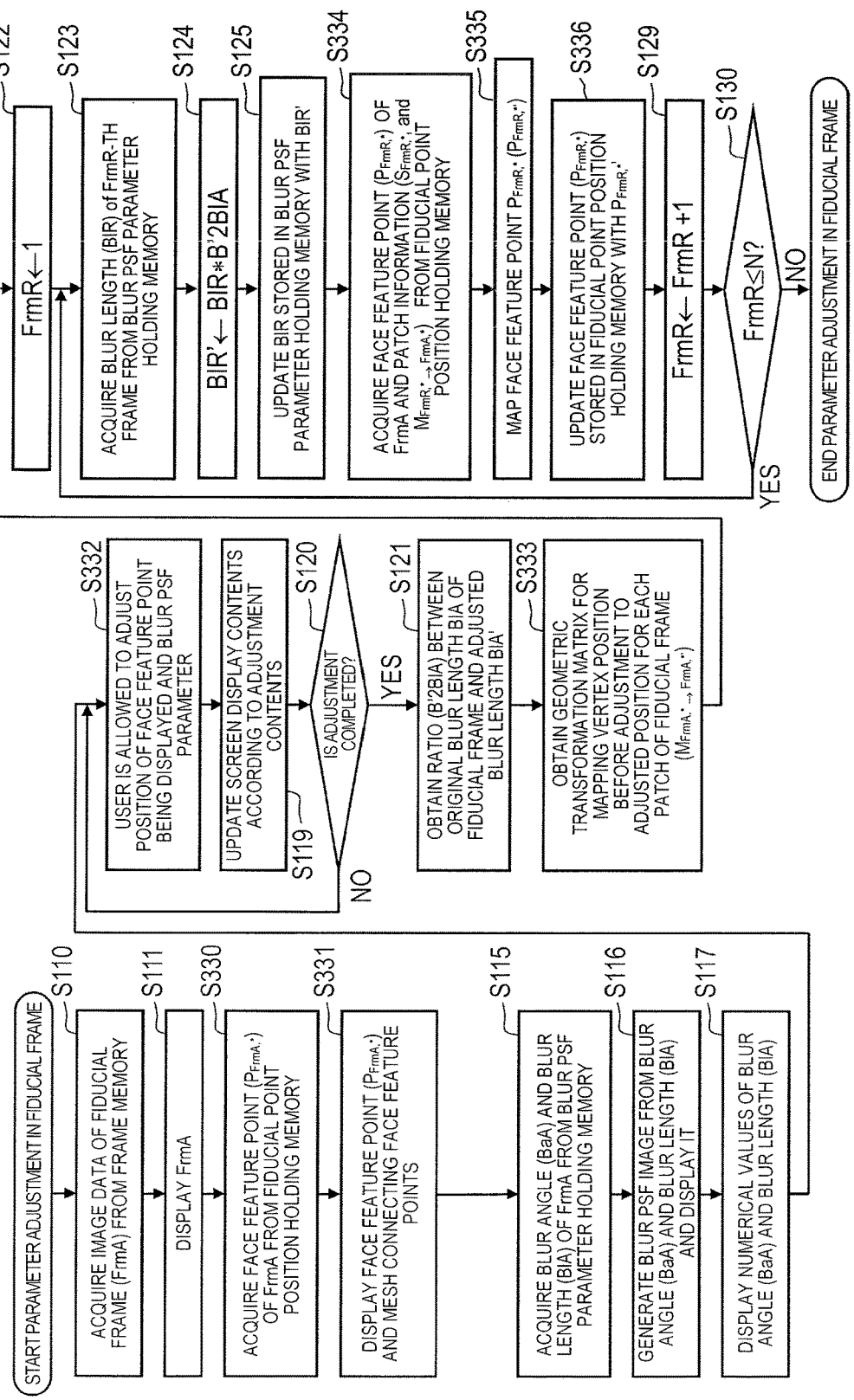
FIG. 28 is a flowchart for explaining a parameter adjustment process in a fiducial frame in the super-resolution process of the image processing device according to Exemplary Embodiment 3.

FIG. 28 is a flowchart for explaining a parameter adjustment process in a fiducial frame. In FIG. 28, steps common to those in FIG. 12 are denoted by the same reference numerals as those in FIG. 12, and a description thereof will be omitted.

In FIG. 28, first, image data of fiducial frame (FrmA) is acquired from frame memory 11 (step S110), and is displayed (step S111). Subsequently, face feature point ($P_{FrmA,*}$) is acquired from fiducial point position holding memory 17A (step S330), and a mesh connecting face feature point $P_{FrmA,*}$ and the face feature point is displayed (step S331).

Subsequently, the blur angle (BaA) and blur length (BlA) of FrmA are acquired from blur PSF parameter holding memory 17B (step S115), and a blur PSF image is generated from the acquired blur angle (BaA) and blur length (BlA) (step S116). The numerical values of blur angle (BaA) and blur length (BlA) are displayed (step S117).

Then, the user adjusts the position of the face feature point being displayed and blur PSF parameter (step S332), and the screen display contents are updated according to the adjustment contents of the user (step S119). It is determined whether or not the adjustment by the user is completed (step S120). In a case where the adjustment is not completed (step S120: NO), the process returns to step S332, and in a case where the adjustment is completed (step S120: YES), a ratio (B'2BlA) between the original blur length BlA of the fiducial frame and the adjusted blur length BlA' is obtained (step S121), and a geometric transformation matrix ($M_{FrmA,* \to FrmA,*'}$) for mapping the vertex position before adjustment to the adjusted position is obtained for each patch of the fiducial frame (step S333).

Subsequently, "1" is set in FrmR (step S122). Blur length (BlR) of the FrmR-th frame is acquired from blur PSF parameter holding memory 17B (step S123), BlR*B'2BlA is calculated, and the result is set to BlR' (step S124). Subsequently, BlR stored in blur PSF parameter holding memory 17B is updated with BlR' (step S125). Subsequently, face feature point ($P_{FrmR,*}$), patch information ($S_{FrmR,*}$), and geometric transformation matrix ($M_{FrmR,* \to FrmA,*}$) of FrmR are acquired from fiducial point position holding memory 17A (step S334), and face feature point $P_{FrmR,*}$ is mapped ($P_{FrmR,*'}$) (see FIG. 29) (step S335).

Subsequently, face feature point $P_{FrmR,*}$ stored in fiducial point position holding memory 17A is updated with $P_{FrmR,*'}$ (step S336). Subsequently, "1" is added to the value of FrmR, and the obtained value is set in FrmR (step S129). It is determined whether or not FrmR is "N" or less (step S130). In a case where FrmR is "N" or less (step S130: YES), the process returns to step S123. In a case where FrmR is more than "N" (step S130: NO), the parameter adjustment process in the fiducial frame is ended.

The process of step S121 to step S130 (that is, a series of processes after completion of the adjustment by the user) greatly reduces the subsequent work required for the individual adjustment of the reference frame.

Other parameters stored in blur PSF parameter holding memory 17B (the size and shape of focus bokeh, intensity setting at the time of bokeh removal, or the like) may be displayed and the user may be allowed to change the setting values.

Next, the details of the mapping process of face feature points in step S335 of FIG. 28 will be described using FIG. 29.

Figure 29:
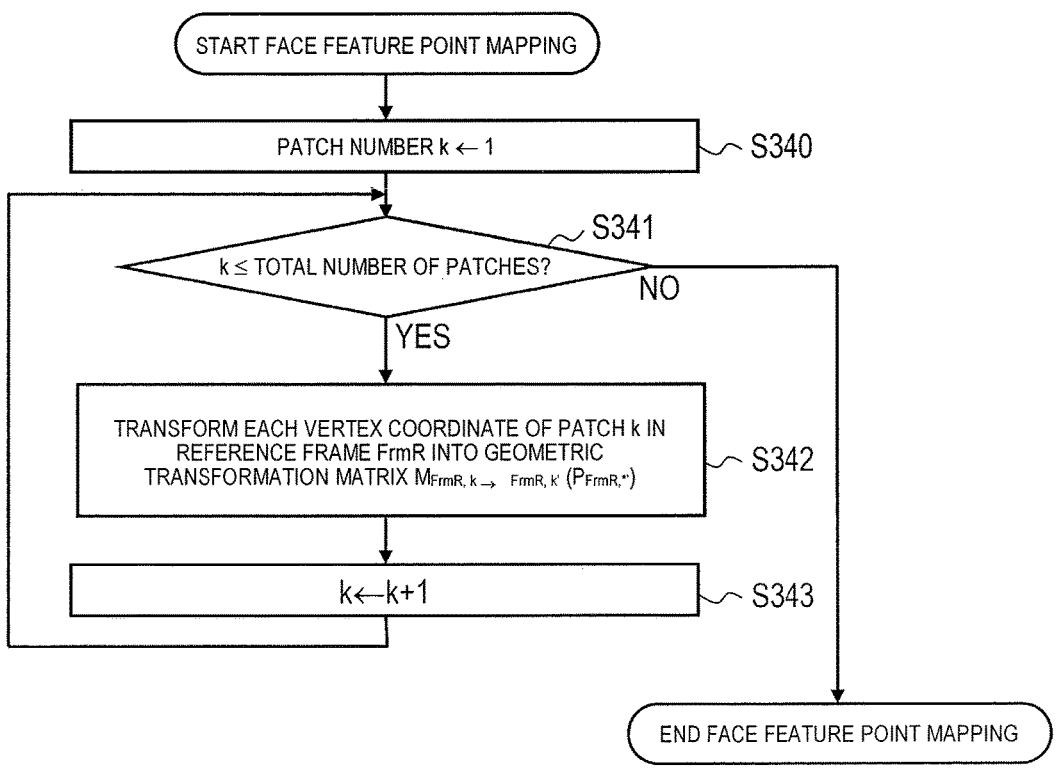
FIG. 29 is a flowchart for explaining details of a face feature point mapping process in the parameter adjustment process in the fiducial frame of Exemplary Embodiment 3.

In FIG. 29, first, the patch number k is set to "1" (step S340), and it is determined whether or not the value of k the total number of patches or less (step S341).

In this determination, in a case where the value of k is the total number of patches or less (step S341: YES), each vertex coordinate of the patch k in the reference frame FrmR is transformed by geometric transformation matrix $M_{FrmR,k \to FrmA,k'}$ ($P_{FrmR,*'}$) (step S342). Thereafter, "1" is added to the value of k, and the obtained value is set to k (step S343), and the process returns to step S341.

On the other hand, in a case where it is determined in step S341 that the value of k is larger than the total number of patches (step S341: NO), the face feature point mapping process in step S335 is ended.

Since the vertex of the patch is shared with the vertex of the adjacent patch, in the flow of FIG. 29, in the coordinate conversion process of a certain patch and the coordinate conversion process of another patch, a plurality of post-conversion coordinates may be calculated for the same vertex (that is, face feature point). Therefore, in the present exemplary embodiment, one post-conversion coordinate is determined among a plurality of calculated post-conversion coordinates by a predetermined method, and the determined coordinate is set as $P_{FrmR,i'}$ for the face feature point i. As a determination method, a method of finding the center of gravity, adopting a first appearance value, adopting a last value, or the like is mentioned.

(Parameter Adjustment Process in Reference Frame)

Figure 30:
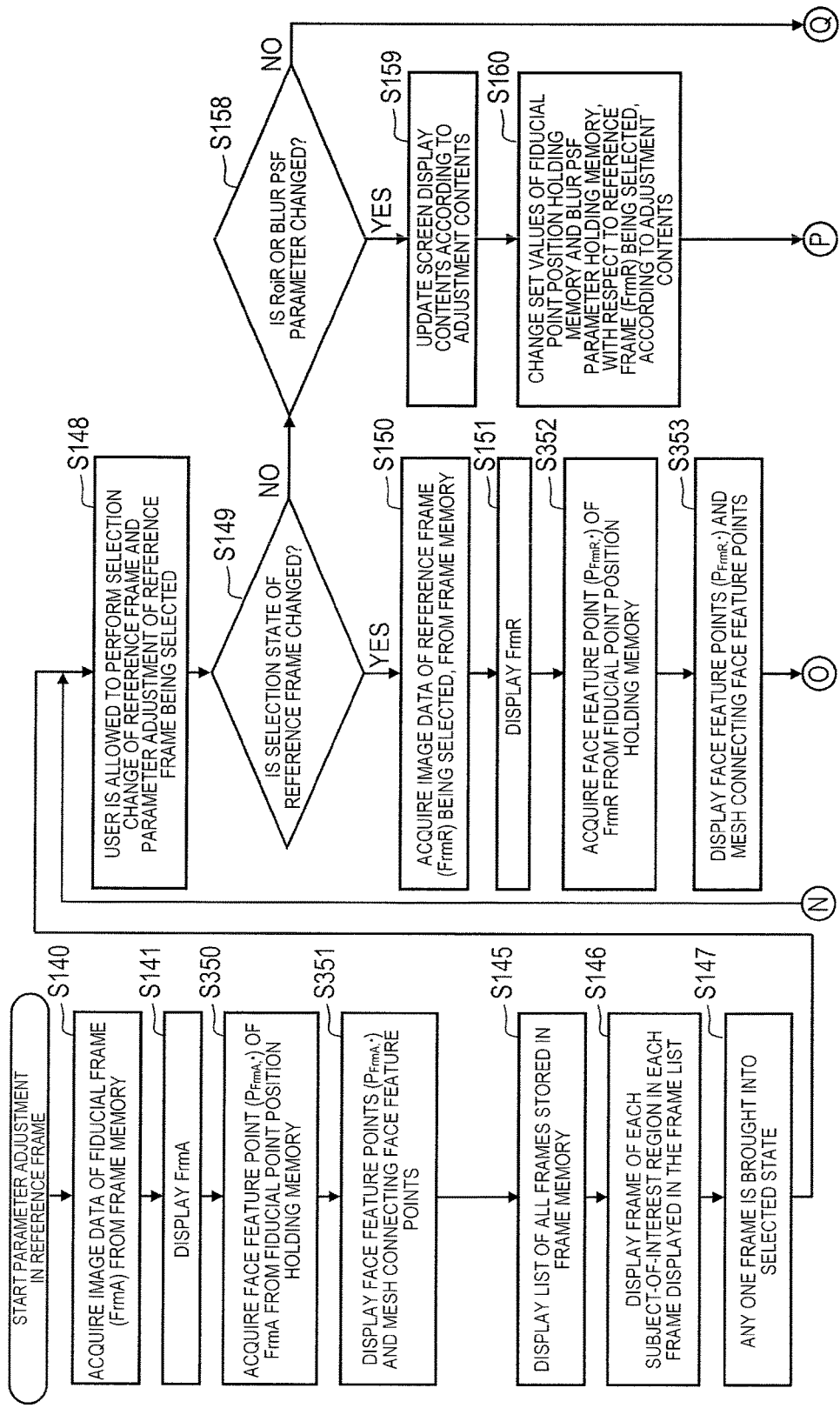
FIG. 30 is a flowchart for explaining the parameter adjustment process in the reference frame in the super-resolution process of the image processing device according to Exemplary Embodiment 3.
Figure 31:
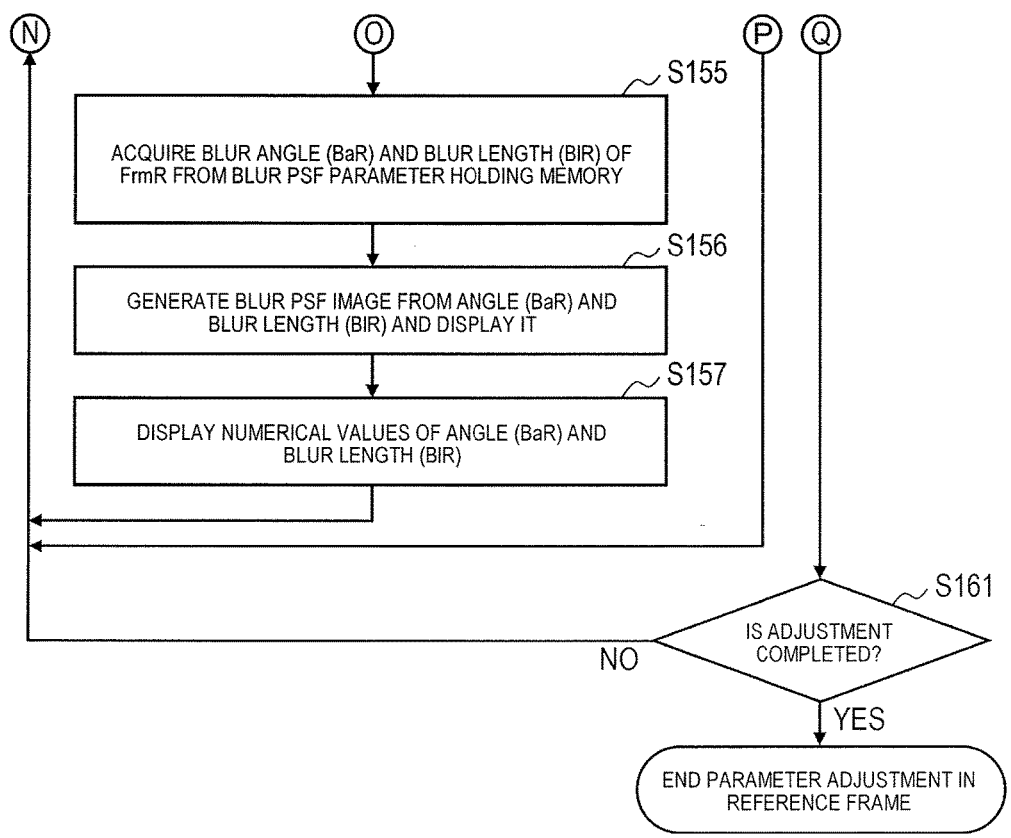
FIG. 31 is a flowchart for explaining the parameter adjustment process in the reference frame in the super-resolution process of the image processing device according to Exemplary Embodiment 3.

FIG. 30 and FIG. 31 are flowcharts for explaining a parameter adjustment process in a reference frame. In FIG. 30 and FIG. 31, steps common to those in FIG. 15 and FIG. 16 are denoted by the same reference numerals as those in FIG. 15 and FIG. 16, and a description thereof will be omitted.

In FIG. 30 and FIG. 31, first, image data of fiducial frame (FrmA) is acquired from frame memory 11 (step S140), and is displayed (step S141). Subsequently, face feature point ($P_{FrmA,*}$) of the FrmA is acquired from fiducial point position holding memory 17A (step S350), and a mesh connecting face feature point $P_{FrmA,*}$ and the face feature point is displayed (step S351). A list of all the frames stored in frame memory 11 is displayed (step S145). A frame of the subject-of-interest region is displayed in each frame displayed in the frame list (step S146).

Subsequently, any one frame is brought into a selection state (step S147), and the user is allowed to perform selection change of a reference frame and parameter adjustment of reference frame being selected (step S148). Subsequently, it is determined whether or not the selection state of the reference frame is changed (step S149). In a case where the selection state of the reference frame is changed (step S149: YES), image data of the reference frame (FrmR) being selected is acquired from frame memory 11 (step S150) and is displays (step S151).

After displaying FrmR, face feature point ($P_{FrmR,*}$) of FrmR is acquired from fiducial point position holding memory 17A (step S352), and a mesh connecting face feature point $P_{FrmR,*}$ and face feature point is displayed (step S353).

The blur angle (BaR) and blur length (BlR) of FrmR are acquired from blur PSF parameter holding memory 17B (step S155), and a blur PSF image is generated from blur angle (BaR) and blur length (BlR) and displayed (step S156). The numerical values of blur angle (BaR) and blur length (BlR) are displayed (step S157). Thereafter, the process returns to step S148.

On the other hand, in a case where it is determined in step S149 that the selection state of the reference frame has not been changed (step S149: NO), it is determined whether or not RoiR or blur PSF parameter has been changed (step S158). In a case where RoiR or blur PSF parameter is changed (step S158: YES), the screen display contents are updated according to the adjustment contents (step S159). The set values of fiducial point position holding memory 17A and blur PSF parameter holding memory 17B with respect to the reference frame (FrmR) being selected are changed (step S160), according to the adjustment contents. Thereafter, the process returns to step S148.

In a case where it is determined in step S158 that the RoiR or blur PSF parameter is not changed (step S158: NO), it is determined whether or not the adjustment is completed (step S161). In a case where the adjustment is not completed (step S161: NO), the process returns to step S148. In a case where the adjustment is completed (step S161: YES), the parameter adjustment process in the reference frame is ended.

(Reconfiguration Process)

Figure 32:
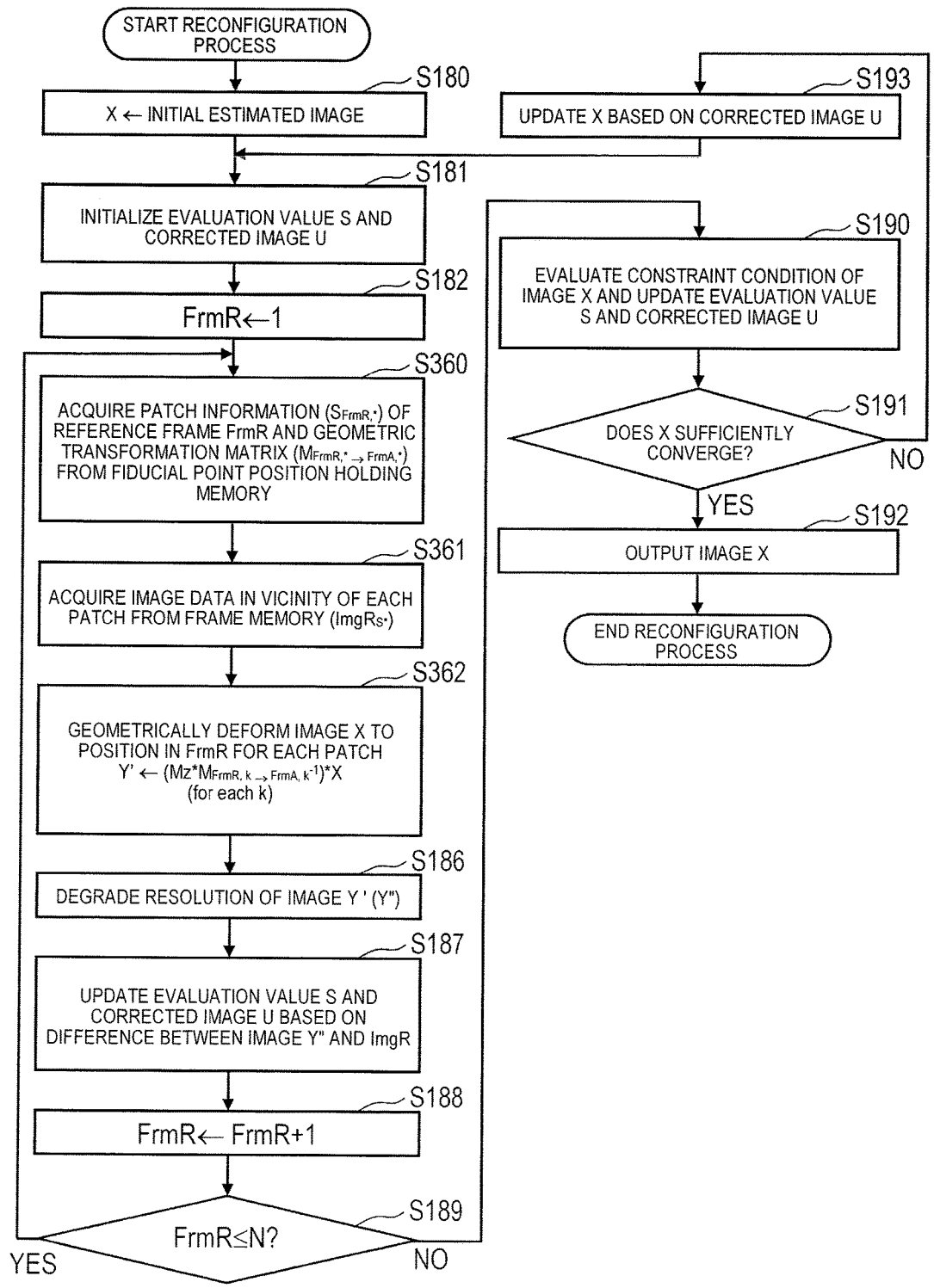
FIG. 32 is a flowchart for explaining a reconfiguration process in the super-resolution process of the image processing device according to Exemplary Embodiment 3.

FIG. 32 is a flowchart for explaining the reconfiguration process. In FIG. 32, steps common to those in FIG. 20 are denoted by the same reference numerals as those in FIG. 20, and a description thereof will be omitted.

In FIG. 32, first, an initial estimated image is set to X (step S180). Subsequently, evaluation value S and corrected image U are initialized (step S181), and thereafter "1" is set in FrmR (step S182).

Subsequently, patch information ($S_{FrmR,*}$) of reference frame FrmR and geometric transformation matrix ($M_{FrmR,* \to FrmA,*}$) are acquired from fiducial point position holding memory 17A (step S360). The image data in the vicinity of each patch is acquired from frame memory 11 ($ImgR_{S*}$) (step S361).

Subsequently, the image X is geometrically deformed to a position in FrmR for each patch (step S362). That is, $(Mz*M_{FrmR,k \to FrmA,k}^{-1})*X$ is calculated for each k, and the result is set to image Y' ($Y' \leftarrow (Mz*M_{FrmR,k \to FrmA,k}^{-1})*X$). Here, Mz is an expansion transformation matrix (when super-resolution magnification is z, it becomes as shown in FIG. 21).

After the image X is geometrically deformed to the position in FrmR, the resolution of the image Y' is degraded (Y") (step S186). Evaluation value S and corrected image U are updated based on the difference between the image Y" and ImgR (step S187). Thereafter, "1" is added to the value of FrmR, and the obtained value is set in FrmR (step S188). It is determined whether or not the value of FrmR is "N" or less (step S189). In a case where the value of FrmR is "N" or less (step S189: YES), the process returns to step S360. In a case where the value of FrmR is more than "N" (step S189: NO), the constraint condition of the image X is evaluated, and evaluation value S and corrected image U are updated (step S190). It is determined whether or not X has converged sufficiently (step S191). In a case where the convergence is sufficient (step S191: YES), the image X is output (step S192), and the reconfiguration process is ended. On the other hand, in a case where X does not sufficiently converge (step S191: NO), X is updated based on corrected image U (step S193), and the process returns to step S181.

(Effect)

As described above, in the present exemplary embodiment, image processing device 1 displays the image and parameter for the fiducial frame (the position of the face feature point, mesh connecting face feature points, and blur PSF parameter), updates the display contents of the image of the fiducial frame based on the adjustment by the user, and stores the adjusted parameter as the parameter for the fiducial frame. Then, when displaying the image of the next reference frame, image processing device 1 displays the stored parameter for the fiducial frame as the parameter for the reference frame, and updates the display contents of the image of the reference frame based on the adjustment by the user, and stores the adjusted parameter as the parameter for the reference frame. Thereafter, when displaying the image of a new reference frame, image processing device 1 displays the parameter for the fiducial frame as the parameter for the new reference frame.

Thus, since the adjustment result in the fiducial frame can be reflected on all the other reference frames, in a case of manually aligning the images of a plurality of input frames, it is possible to reduce the input work, and improve work efficiency. As a result, since the number of frames that can be used for the super-resolution process increases, a high-resolution image can be obtained by the super-resolution process.

(Exemplary Embodiment 4)

In Exemplary Embodiment 4, a blur PSF estimation process different from that described with reference to FIG. 26 and FIG. 27 in Exemplary Embodiment 3 will be described.

(Blur PSF Estimation Process)

Figure 33:
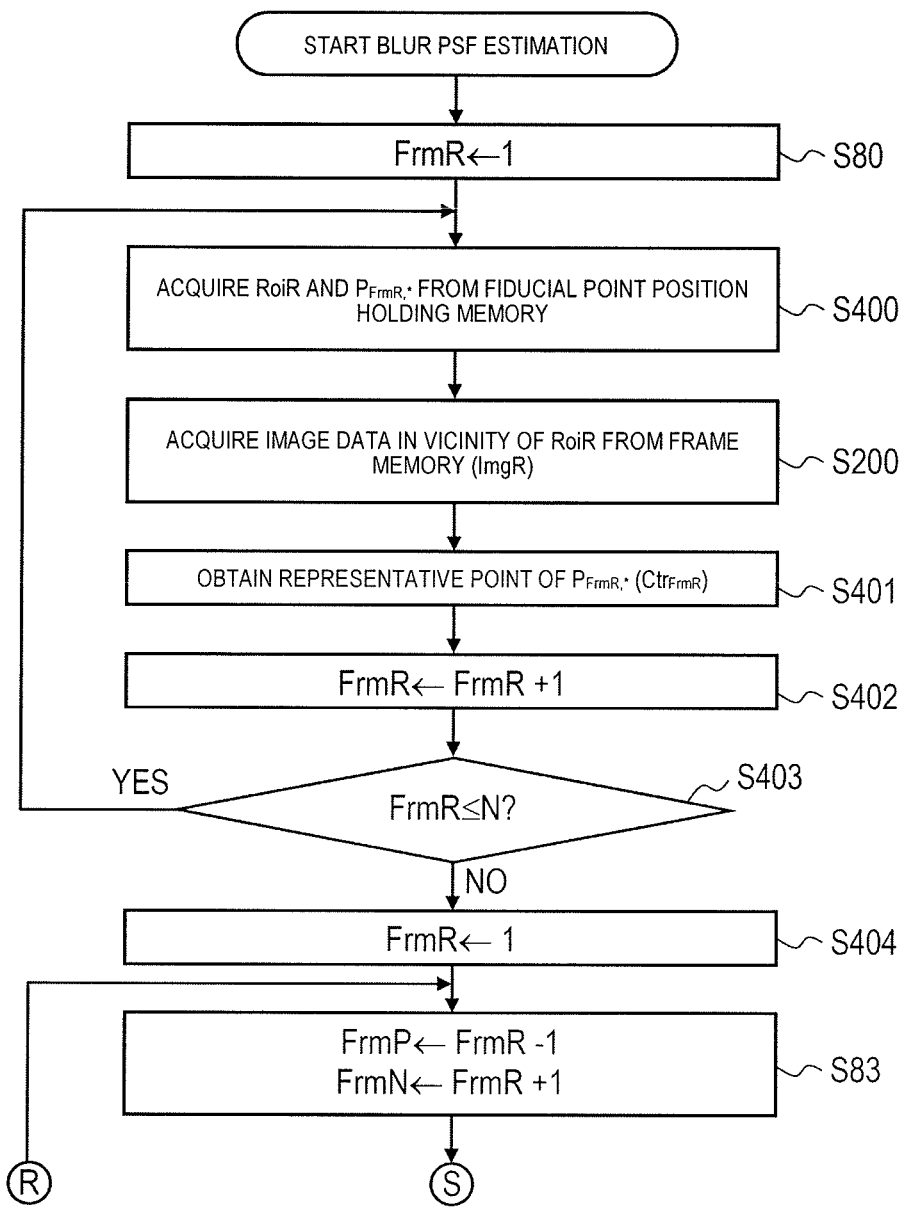
FIG. 33 is a flowchart for explaining blur PSF estimation process in the super-resolution process of the image processing device according to Exemplary Embodiment 4.
Figure 34:
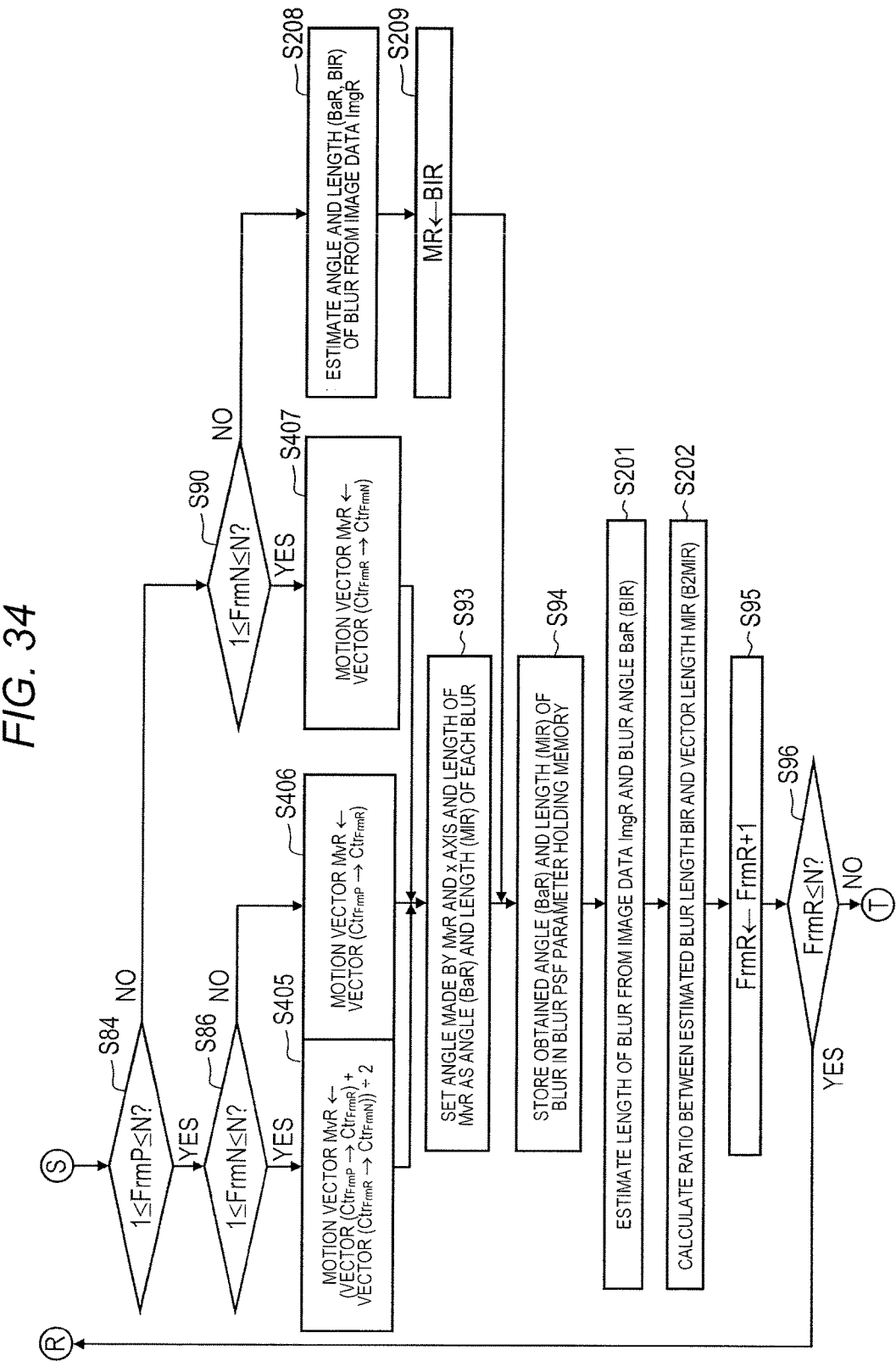
FIG. 34 is a flowchart for explaining blur PSF estimation process in the super-resolution process of the image processing device according to Exemplary Embodiment 4.
Figure 35:
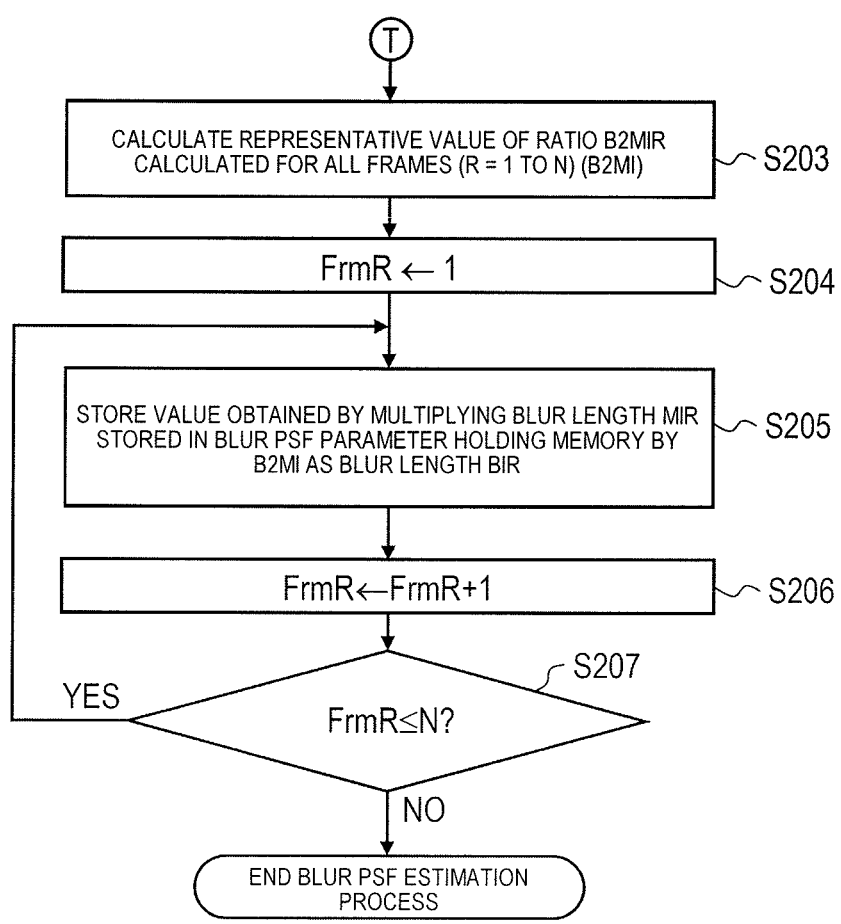
FIG. 35 is a flowchart for explaining blur PSF estimation process in the super-resolution process of the image processing device according to Exemplary Embodiment 4.

FIG. 33, FIG. 34, and FIG. 35 are flowcharts for explaining blur PSF estimation process of image processing device 1 according to the present exemplary embodiment. In FIG. 33, FIG. 34, and FIG. 35, steps common to those in FIG. 26 and FIG. 27 are denoted by the same reference numerals as those in FIG. 26 and FIG. 27, and a description thereof will be omitted.

In FIG. 33, FIG. 34, and FIG. 35, first, "1" is set in FrmR (step S80). Subsequently, $P_{FrmR,*}$ is acquired from fiducial point position holding memory 17A (step S400). The acquired image data (ImgR) in the vicinity of the RoiR is acquired from frame memory 11 (step S200). Subsequently, the representative point of the acquired $P_{FrmR,*}$ is obtained ($Ctr_{FrmR}$) (step S401). Thereafter, "1" is added to the value of FrmR, and the obtained value is set in FrmR (step S402). Subsequently, it is determined whether or not the value of FrmR is "N" or less (step S403). In a case where the value of FrmR is "N" or less (step S403: YES), the process returns to step S400.

On the other hand, in a case where it is determined in step S403 that the value of FrmR is larger than "N" (step S403: NO), the value of FrmR is set to "1" (step S404).

Subsequently, the value of FrmR is decremented by "1", the obtained value is set in FrmP, "1" is added to the value of FrmR, and the obtained value is set in FrmN (step S83). It is determined whether or not the value of FrmP is "N" or less (step S84). In a case where the value of FrmP is "1" or more and "N" or less (step S84: YES), the process returns to step S86.

In a case where it is determined whether or not the value of FrmN is "1" or more and "N" or less (step S86). In a case where the value of FrmP is "1" or more and "N" or less (step S86: YES), the value of (vector ($Ctr_{FrmP} \to Ctr_{FrmR}$)+vector ($Ctr_{FrmR} \to Ctr_{FrmN}$))÷2 is set to motion vector MvR (step S405).

On the other hand, in a case where it is determined in step S86 that the value of FrmN is less than "1" or more than "N" (step S86: NO), the vector ($Ctr_{FrmP} \to Ctr_{FrmR}$) is set to motion vector MvR (step S406).

In a case where it is determined in step S84 that the value of FrmP is less than "1" or more than "N" (step S84: NO), it is determined whether or not the value of FrmN is "1" or more and "N" or less (step S90). In a case where the value of FrmN is "1" or more and "N" or less (step S90: YES), the value of vector ($Ctr_{FrmR} \to Ctr_{FrmN}$) is set to motion vector MvR (step S407).

After performing any one of step S405, S406, and S407, the angle made by MvR and the x axis and the length of MvR are set as the angle (BaR) and length (BlR) of blur (step S93). The obtained angle (BaR) and length (BlR) of blur are stored in blur PSF parameter holding memory 17B (step S94). Subsequently, the length of blur is estimated from the image data ImgR and the blur angle BaR (BlR) (step S201). Then, the ratio between the estimated blur length BlR and the vector length MlR is calculated (B2MlR) (step S202).

Thereafter, "1" is added to the value of FrmR, and the obtained value is set in FrmR (step S95). It is determined whether or not FrmR is "N" or less (step S96). In a case where FrmR is "N" or less (step S96: YES), the process returns to step S83. On the other hand, in a case where FrmR is more than "N" (step S96: NO), a representative value of the ratio B2MlR calculated for all frames (R=1 to N) is calculated (B2Ml) (step S203). Thereafter, "1" is set in FrmR (step S204). Subsequently, a value obtained by multiplying blur length MlR stored in blur PSF parameter holding memory 17B by B2Ml is stored as blur length BlR (step S205). Subsequently, "1" is added to the value of FrmR, the obtained value is set in FrmR (step S206), and it is determined whether or not FrmR is "N" or less (step S207). In a case where FrmR is "N" or less (step S207: YES), the process returns to step S205. On the other hand, in a case where FrmR is more than "N" (step S207: NO), blur PSF estimation process is ended.

On the other hand, in a case where it is determined in step S90 that the value of FrmN is less than "1" or more than "N" (step S90: NO), the angle and length (BaR, BlR) of blur is estimated from image data ImgR (step S208). Thereafter, the value of BlR is set to MlR (step S209), and the process returns to step S94.

(Effect)

As described above, according to the present exemplary embodiment, when estimating the length of blur PSF in the blur PSF estimation process, the length of blur PSF is estimated from one piece of image data, a ratio between the estimated length of blur PSF and the length of the motion vector is calculated for each frame, the ratio is smoothed over all the frames, and the length of blur PSF of each frame is calculated by multiplying the length of each motion vector by the smoothed ratio. This makes it possible to estimate the length of blur PSF considering the shutter speed of the camera, so it is possible to perform a blur removal process with accurate blur PSF, and to obtain a sharp image without ringing noise.

INDUSTRIAL APPLICABILITY

The present disclosure is suitable for use in an image processing device which processes an image captured by a surveillance camera.

REFERENCE MARKS IN THE DRAWINGS

1 IMAGE PROCESSING DEVICE
10 IMAGE DATA INPUT UNIT
11 FRAME MEMORY
12 GRAPHICAL USER INTERFACE UNIT
13 FIDUCIAL FRAME SELECTION UNIT
14 SUBJECT-OF-INTEREST REGION SELECTION UNIT
15 MATCHING CALCULATION UNIT
16 BLUR PSF ESTIMATION UNIT
17 MEMORY UNIT
17A FIDUCIAL POINT POSITION HOLDING MEMORY
17B BLUR PSF PARAMETER HOLDING MEMORY
18 FIDUCIAL FRAME ADJUSTMENT UNIT
19 REFERENCE FRAME ADJUSTMENT UNIT
20 BLUR REMOVAL UNIT
21 RECONFIGURATION PROCESSING UNIT
22 SUPER-RESOLUTION IMAGE OUTPUT UNIT
23 IMAGE GENERATION UNIT
100 NUMBER PLATE

The invention claimed is:

1. An image processing device which aligns low-resolution images of a plurality of input frames each having a common partial region to generate a high-resolution image, comprising:
a fiducial frame adjustment unit that displays a parameter used when an image of one fiducial frame selected from the plurality of input frames and a high-resolution image are generated, updates display contents of the image of the fiducial frame based on adjustment of the displayed parameter, and stores the adjusted parameter as a parameter for the fiducial frame in a memory;
a reference frame adjustment unit that displays an image of a reference frame which is one of the input frames other than the fiducial frame and a parameter for the fiducial frame as a parameter for the reference frame, updates display contents of the image of the reference frame based on adjustment of the displayed parameter, and stores the adjusted parameter as the parameter for the reference frame in a memory;
a blur removal unit that performs a process of removing blur included in the input frames, using the corresponding parameter, for each of the input frames; and
an image generation unit that aligns low-resolution images of the blur-removed input frames to generate a high-resolution image.

2. The image processing device according to claim 1, wherein the parameter is a length of blur point spread function (PSF),
the image processing device further comprising:
a blur PSF estimation unit that calculates a motion vector between a plurality of input frames adjacent to the input frame in a time direction, for each of the input frames, and estimates the length and angle of the blur PSF of each of the input frames from the length and direction of the motion vector,
wherein the fiducial frame adjustment unit calculates a ratio between the length of the blur PSF of the fiducial frame estimated by the blur PSF estimation unit and the length of the blur PSF after the adjustment, and multiplies the length of the blur PSF of each of the input frames other than the fiducial frame by the ratio.

3. The image processing device according to claim 2, wherein the blur PSF estimation unit, when estimating the length of blur PSF, estimates the length of the blur PSF from image data of each of the input frames, calculates a ratio between the estimated length of blur PSF and the length of the motion vector for each frame, smoothes the ratio over all the frames, and calculates the length of blur PSF of each frame by multiplying the length of each motion vector by the smoothed ratio.

4. The image processing device according to claim 1, wherein the parameter is coordinates of a plurality of fiducial points indicating the position of the partial region included in each of the input frames, and
wherein the fiducial frame adjustment unit displays coordinates of the plurality of fiducial points of the fiducial frame, updates the coordinates of the plurality of fiducial points of an image of the fiducial frame, based on adjustment of the displayed coordinates of the plurality of fiducial points, and stores the adjusted coordinates of the plurality of fiducial points in a memory.

5. The image processing device according to claim 1, wherein the partial region is a facial image,
wherein the parameter is positions of a plurality of face feature points of the facial image included in each of the input frames, and
wherein the fiducial frame adjustment unit displays the positions of the face feature points of the fiducial frame and a mesh connecting the face feature points, updates the positions of the face feature points of an image of the fiducial frame based on adjustment of the displayed positions of the face feature points, and stores the adjusted positions of the face feature points in a memory.

\* \* \* \* \*